United States Patent
Curtis et al.

(10) Patent No.: US 12,333,802 B2
(45) Date of Patent: Jun. 17, 2025

(54) SYSTEM AND METHOD FOR THREE DIMENSIONAL OBJECT COUNTING UTILIZING POINT CLOUD ANALYSIS IN ARTIFICIAL NEURAL NETWORKS

(71) Applicant: DELICIOUS AI LLC, Lehi, UT (US)

(72) Inventors: Brad Curtis, Highland, UT (US); Kyle William Armstrong, South Jordan, UT (US); Porter Reece Jenkins, American Fork, UT (US)

(73) Assignee: DELICIOUS AI LLC, Lehi, UT (US)

( * ) Notice: Subject to any disclaimer, the term of this patent is extended or adjusted under 35 U.S.C. 154(b) by 826 days.

(21) Appl. No.: 17/501,810

(22) Filed: Oct. 14, 2021

(65) Prior Publication Data

US 2022/0121852 A1    Apr. 21, 2022

Related U.S. Application Data

(60) Provisional application No. 63/092,238, filed on Oct. 15, 2020.

(51) Int. Cl.
| | |
|---|---|
| *G06V 20/00* | (2022.01) |
| *G06F 18/24* | (2023.01) |
| *G06F 18/25* | (2023.01) |
| *G06F 18/40* | (2023.01) |
| *G06N 3/045* | (2023.01) |

(Continued)

(52) U.S. Cl.
CPC .............. *G06V 20/20* (2022.01); *G06F 18/24* (2023.01); *G06F 18/251* (2023.01); *G06F 18/40* (2023.01); *G06N 3/045* (2023.01); *G06Q 10/087* (2013.01); *G06V 10/225* (2022.01); *G06V 10/40* (2022.01); *G06V 10/95* (2022.01); *G06V 20/64* (2022.01); *G01S 7/4802* (2013.01); *G01S 17/42* (2013.01)

(58) Field of Classification Search
CPC ...... G06V 20/20; G06V 10/225; G06V 10/40; G06V 10/95; G06V 20/64; G06V 10/44; G06V 10/7715; G06V 10/803; G06V 10/82; G06V 10/945; G06V 20/52; G06F 18/24; G06F 18/251; G06F 18/40; G06N 3/045; G06N 3/08; G06Q 10/087; G01S 7/4802; G01S 17/42; G01S 17/86; G01S 17/894

See application file for complete search history.

(56) References Cited

U.S. PATENT DOCUMENTS

| | | |
|---|---|---|
| 9,996,818 B1 | 6/2018 | Ren et al. |
| 10,157,452 B1 | 12/2018 | Tighe et al. |

(Continued)

OTHER PUBLICATIONS

Azmy, Suzanna Noor et al., "Counting in the dark: Non-intrusive laser scanning for population counting and identifying roosting bats", Scientific Reports, Jul. 23, 2012, pp. 1-4.

(Continued)

*Primary Examiner* — Pakee Fang
(74) *Attorney, Agent, or Firm* — Workman Nydegger

(57) ABSTRACT

Systems and methods for three-dimensional object counting in a three-dimensional space include an image capture device configured to obtain at least one 2D image of the three-dimensional space, a scanner configured to obtain a 3D point cloud of the three-dimensional space, and a processor configured to cooperate with at least one artificial neural network, the at least one artificial neural network configured to classify and count objects in the three-dimensional space.

20 Claims, 12 Drawing Sheets

(51) Int. Cl.
*G06Q 10/087* (2023.01)
*G06V 10/22* (2022.01)
*G06V 10/40* (2022.01)
*G06V 10/94* (2022.01)
*G06V 20/20* (2022.01)
*G06V 20/64* (2022.01)
*G01S 7/48* (2006.01)
*G01S 17/42* (2006.01)

(56) References Cited

U.S. PATENT DOCUMENTS

| | | | |
|---|---|---|---|
| 10,339,656 | B1 | 7/2019 | Le et al. |
| 10,625,426 | B2 | 4/2020 | Bogolea et al. |
| 12,073,571 | B1* | 8/2024 | Cherevatsky ........... G06T 11/60 |
| 2003/0154141 | A1 | 8/2003 | Capazario et al. |
| 2019/0096135 | A1* | 3/2019 | Dal Mutto ........ G06F 18/24765 |
| 2019/0108396 | A1* | 4/2019 | Dal Mutto ............. G06V 20/52 |
| 2019/0149725 | A1 | 5/2019 | Adato et al. |
| 2019/0236531 | A1 | 8/2019 | Adato et al. |
| 2020/0005020 | A1 | 1/2020 | Meany et al. |
| 2020/0151421 | A1 | 5/2020 | Adato et al. |
| 2020/0342288 | A1* | 10/2020 | Xi ........................... G06F 17/11 |
| 2022/0058369 | A1* | 2/2022 | Alahmari .............. G06F 18/285 |
| 2022/0121852 | A1* | 4/2022 | Curtis .................... G06N 3/045 |
| 2024/0212322 | A1* | 6/2024 | Bennet .................. G06N 3/0464 |

OTHER PUBLICATIONS

Bailey, Tim et al., "Simultaneous Localization and Mapping (SLAM): Part II", IEEE Robotics & Automation Magazine, as early as Sep. 1, 2006, pp. 108-117, vol. 13, Issue 3.
Chen, Xiaozhi et al., "Multi-view 3d object detection network for autonomous driving", 2017 IEEE Conference on Computer Vision and Pattern Recognition (CVPR), Jun. 22, 2017, 9 pages.
Dai, Jifeng, "R-FCN: Object Detection via Region-based Fully Convolutional Networks", NIPS'16: Proceedings of the 30th International Conference on Neural Information Processing Systems, Dec. 5, 2016, pp. 1-9.
Durrant-Whyte, Hugh et al., "Simultaneous Localization and Mapping: Part I", IEEE Robotics & Automation Magazine, as early as Jun. 1, 2006, pp. 99-108, vol. 13, Issue 2.
Huang, Jonathan et al., "Speed/accuracy trade-offs for modern convolutional object detectors", IEEE, Nov. 9, 2017, pp. 1-21, retrieved from <https://arxiv.org/pdf/1611.10012.pdf>.
Laina, Iro et al., "Deeper Depth Prediction with Fully Convolutional Residual Networks", IEEE, Dec. 19, 2016, 12 pages, retrieved from <https://arxiv.org/pdf/1606.00373.pdf>.
Lin, Tsung-Yi et al., "Focal Loss for Dense Object Detection", arXiv.org, Feb. 7, 2018, pp. 1-10.
Liu, Wei et al., "SSD: Single Shot MultiBox Detector", Lecture Notes in Computer Science (LNIP), Dec. 29, 2016, pp. 1-17, vol. 9905.
Peitrini et al., "An IoT Edge-Fog-Cloud Architecture for Vision Based Planogram Integrity", Association for Computing Machinery, Proceedings of the 13th International Conference on Distributed Smart Cameras, Sep. 1, 2019, 5 pages.
Qi, Charles R. et al., "PointNet: Deep Learning on Point Sets for 3D Classification and Segmentation", 2017 IEEE Conference on Computer Vision and Pattern Recognition (CVPR), Apr. 10, 2017, 19 pages.
Qi, Charles R. et al., "PointNet++: Deep Hierarchical Feature Learning on Point Sets in a Metric Space", Conference on Neural Information Processing Systems (NIPS) 2017, Jun. 7, 2017, pp. 1-14.
Redmon, Joseph et al., "You Only Look Once: Unified, Real-Time Object Detection", 2016 IEEE Conference on Computer Vision and Pattern Recognition (CVPR), May 9, 2016, 10 pages.
Ren, Shaoqing et al., "Faster R-CNN: Towards Real-Time Object Detection with Region Proposal Networks", Advances in Neural Information Processing Systems 28 (NIPS 2015), Jan. 6, 2016, pp. 1-14.
Snap2insight, "Win at the Shelf", as early as Jan. 1, 2020, 7 pages, retrieved from <https://snap2insight.com> on Jun. 17, 2020.
Structure, "Structure Sensor: 3D scanning, augmented reality, and more for mobile devices.", Sep. 22, 2020, 4 pages, retrieved from <https://web.archive.org/web/20200922051230/https://structure.io/structure-sensor> on Apr. 2, 2025.
Szegedy, Christian et al., "Scalable High Quality Object Detection", arXiv.org, as early as Dec. 1, 2014, 10 pages.
Verma, Nitika et al., "FeaStNet: Feature-Steered Graph Convolutions for 3D Shape Analysis", 2018 IEEE Conference on Computer Vision and Pattern Recognition (CVPR), Mar. 28, 2018, 9 pages.
Wang, Yue et al., "Dynamic Graph CNN for Learning on Point Clouds", arXiv.org, Jan. 24, 2018, pp. 1-14.
Wikipedia, "Voxel", Sep. 6, 2020, 9 pages, retrieved from <https://web.archive.org/web/20200906002637/https://en.wikipedia.org/wiki/Voxel> on Apr. 2, 2025.
Yang, Bin et al., "Pixor: Real-time 3d object detection from point clouds", 2018 IEEE/CVF Conference on Computer Vision and Pattern Recognition, Mar. 2, 2019, 10 pages.
Zenodo, "ultralytics/yolov5: v3.0", Aug. 13, 2020, 9 pages, retrieved from <https://zenodo.org/record/3983579> on Apr. 2, 2025.
International Search Report from PCT Application No. PCT/US2023/084221, Mar. 19, 2024.

\* cited by examiner

SYSTEM AND METHOD FOR THREE DIMENSIONAL OBJECT COUNTING UTILIZING POINT CLOUD ANALYSIS IN ARTIFICIAL NEURAL NETWORKS

CROSS-REFERENCE TO RELATED APPLICATIONS

This application claims the benefit of and priority to U.S. Provisional Patent Application Ser. No. 63/092,238, filed Oct. 15, 2020, and entitled "System and Method for Three-Dimensional Object Counting," which application is expressly incorporated herein by reference in its entirety.

TECHNICAL FIELD

The disclosure relates to a system and method for three-dimensional object counting, particularly in retail and warehouse environments.

BACKGROUND

Retailers of all sizes, including convenience stores, grocery stores, one-stop-shopping centers, specialized retailers such as electronics, apparel, or outdoor good stores, may sell on the order of 100,000 or more unique products in thousands of product classes. Products must be suitably arranged on up to hundreds of different shelving units, refrigeration units, and kiosks in different locations of the store, determining a desired selection, quantity, and arrangement of products in the above-mentioned locations is a highly involved and as yet unsolved problem.

This is compounded by the dynamic needs and preferences of consumers throughout the course of the year and even the course of the day and based on a location of a store, as different products become more or less popular based on the time of year, the weather, demographics, and/or the time of day, in response to marketing campaigns, as prices and availability of products change, and as certain products become less popular over time and newer products become more popular as they are adopted by consumers. As a result, the retailing shopping experience is an extremely visually complex experience for consumers, with complex emotional responses by the consumers.

The need to properly identify and arrange objects in a space applies equally to warehouses such as fulfillment and distribution centers, as the identity and quantity of objects must be properly determined and monitored to maintain operational efficiency and supply-chain requirements, and with millions of items being held in and distributed through the fulfillment center on any given day. This, too, is constantly changing in view of changing preferences by consumers and changing product offerings. With the movement of goods being increasingly performed by automated systems rather than by humans, the need for a system and method for automatically and accurately identifying and counting 3D objects is increasingly important.

Vendors, retailers and inventory managers currently rely on expensive audits, frequently done manually, in which products are counted or tracked, shelf space is assessed, and the number of products is calculated and ordered. An end result of this process is to provide detailed recommendations to sales people and retailers regarding what, where, and how much of an object or product to provide. This process is still a necessarily manual and specialized process requiring significant time and expense, and must be repeated at regular intervals in view of the dynamic factors mentioned above, namely the changing preferences of consumers throughout the year and as products themselves become more or less popular with consumers. The high cost of such audits often renders such services out of reach for smaller storekeepers and retailers. Further, the manual nature of such processes inevitably results in inaccuracies.

Taking stock of inventory for the purposes of inventory review, financial audits, due diligence, and other purposes is also a manual process requiring the efforts of temporary workers to identify and count objects in a space. Such work is time consuming, expensive, physically demanding, tedious, and subject to human error in identifying and counting inventory in a store or warehouse.

Other existing approaches to the problem of arranging products and inventory rely on image recognition technology to identify two-dimensional features such as stock-keeping units (SKUs), but this approach is limited in its effectiveness by the fact that products are necessarily three-dimensional (3D), are densely stacked, and are normally stocked several items deep on a shelf, with inevitable mismatches, known as "disruptors," due to consumers or stockers replacing objects on shelves in the wrong location. Further, objects that have been bumped out of the proper position by consumers may also be mistaken or not recognized during image recognition. Existing image recognition approaches also may incorrectly estimate the 3D bounds of objects. These difficulties render any assessment by existing image recognition approaches, particularly of a number of objects on a shelf at any given time, highly suspect.

Approaches that utilize 3D object detectors, such as those used in autonomous driving, typically train neural networks while performing regression in 3D space to make predictions about the location of objects in a scene, rather than a count of the objects, and require collecting samples of 3D scenes and bounding boxes, but such processes are tedious and not directly necessary for count inference. Applying such object detectors disadvantageously requires collecting thousands of samples of 3D scenes with human-labeled 3D bounding boxes, which is time consuming, expensive, and difficult to scale as more classes of objects are added to the model, Such object detectors also are poorly adapted to detecting densely spaced objects which are likely to overlap in the field of view of the camera and make it difficult to capture shape information of the objects. Additionally, such object detectors are poorly adapted to classifying different objects with the same geometric shape due to the absence of semantic visual information, such as RGB images. For example, such object detectors are poorly adapted to distinguishing between similarly shaped 2-liter bottles of different flavors of soft drinks or different varieties of loaves of bread, as the different varieties of soft drinks and bread have the same or a very similar point cloud shape. In view of these limitations, 3D object detectors are insufficient to performing consistent and accurate product classification.

Arranging, stocking, and maintaining inventory on aisles of a store remains a highly involved process requiring immense marketing insight and management of individual product placement, as there is as yet no reliable and quantifiable method for inferring counts of 3D objects and automatically, rather than manually, assessing the ideal placement of products. Often the success or failure of a display or arrangement to generate increased sales or foot traffic cannot be attributed to a particular factor, making successes difficult to replicate.

The selection, quantity, and placement of items in stores and warehouses thus frequently remains a matter of subjective and sometimes arbitrary intuition, preferences, and inflexible, outdated heuristics rather than being an exercise in quantitative optimization based on the circumstances of particular locations, demographics, seasons, dynamic consumer preferences, and variable product offerings and prices. The selection, quantity, and arrangement of items is thus subject to numerous errors and inefficiencies.

SUMMARY

A system for three-dimensional object counting in a three-dimensional space is provided. The system comprises an image capture device configured to obtain at least one 2D image of the three-dimensional space, a scanner configured to obtain a 3D point cloud of the three-dimensional space, and a processor configured to cooperate with at least one artificial neural network, the at least one artificial neural network being configured to classify and count objects in the three-dimensional space.

A method for three-dimensional object counting is also provided. The method comprises capturing with an image capture device a 2D image of at least one object in a three-dimensional space, scanning with a scanner the three-dimensional space to obtain a 3D point cloud, using a processor to cooperate with at least one artificial neural network to classify and count objects in the three-dimensional space.

A non-transitory hardware storage device having stored thereon computer executable instructions which, when executed by one or more processors of a computer, configure the computer to capture with an image capture device a 2D image of at least one object in a three-dimensional space, scan with a scanner the three-dimensional space to obtain a 3D point cloud, use a processor to cooperate with at least one artificial neural network to classify and count objects in the three-dimensional space.

In preferred embodiments of a system and method for three-dimensional object counting advantageously utilize a novel monocular architecture that leverages image recognition, in embodiments utilizing 2D images, such as RGB or truecolor images, in combination with 3D scanning to identify and count the number of products in a display or shelf. The system and method of these or other preferred embodiments develop a map of displays and/or shelves in a store and/or warehouse to provide spatial awareness data. Using the developed map in conjunction with the identified and counted products and optionally one or more of sales data, segmentation, spatial data, seasonality, and competitive information, the system and method automatically generates a display or shelf configuration. Additionally, the system and method preferably generate actionable information for why a particular display or shelf resulted in sales and generates an improved selection, quantity, and configuration of objects in a space such as a store or warehouse.

BRIEF DESCRIPTION OF THE DRAWINGS

These and other features, aspects, and advantages of the present disclosure will become better understood regarding the following description, appended claims, and accompanying drawings.

DETAILED DESCRIPTION

Overview

Figure 1:
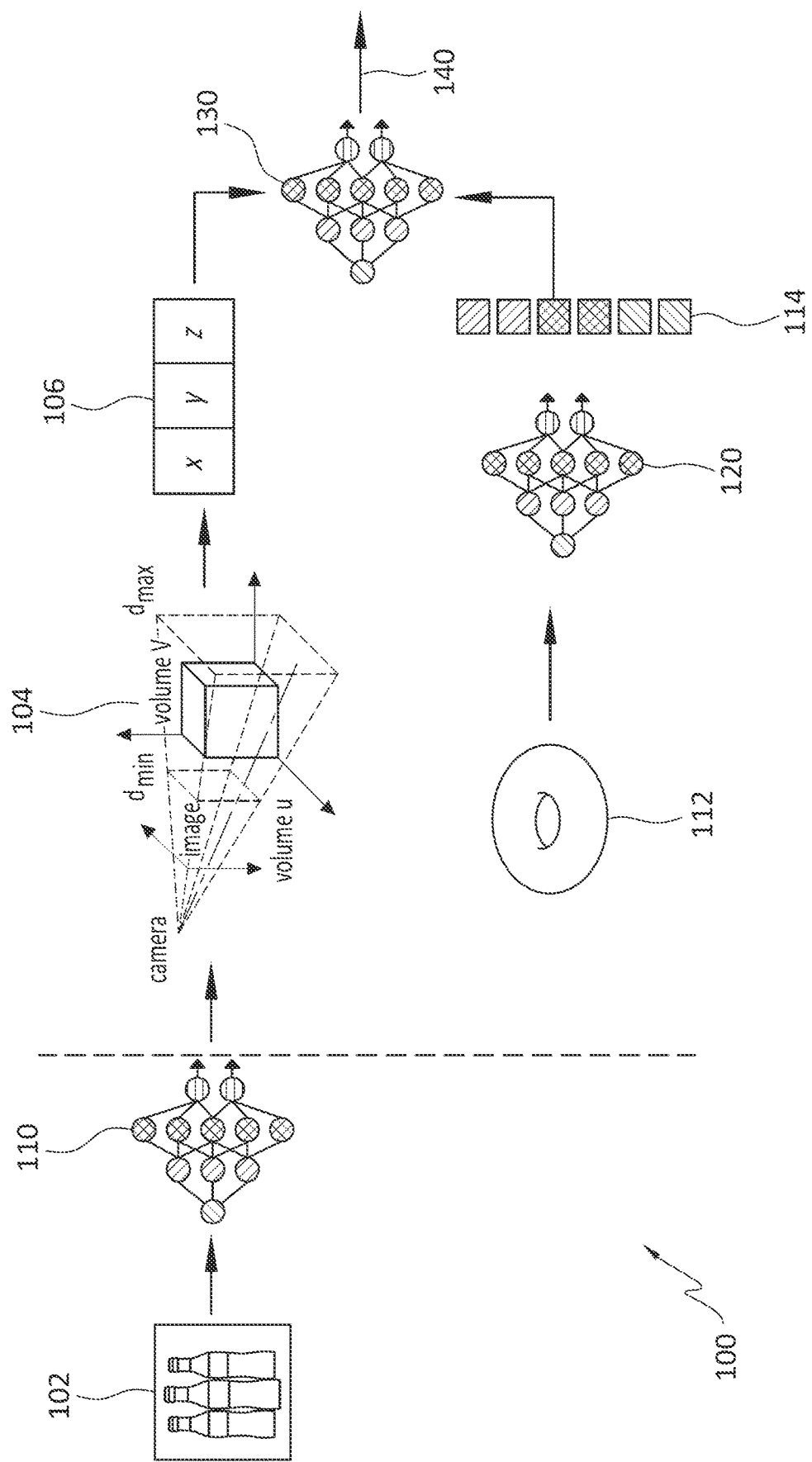
FIG. 1 is a diagram of a system for three-dimensional object counting according to an embodiment of the disclosure.

A better understanding of different embodiments of the disclosure may be had from the following description read with the accompanying drawings in which like reference characters refer to like elements.

While the disclosure is susceptible to various modifications and alternative constructions, certain illustrative embodiments are in the drawings and are described below. It should be understood, however, there is no intention to limit the disclosure to the specific embodiments disclosed, but on the contrary, the intention covers all modifications, alternative constructions, combinations, and equivalents falling within the spirit and scope of the disclosure.

It will be understood that unless a term is expressly defined in this application to possess a described meaning, there is no intent to limit the meaning of such term, either expressly or indirectly, beyond its plain or ordinary meaning.

As described herein, a "monocular architecture" refers to a framework for conducting an analysis, such as object counting, that includes at least two modalities configured for providing different insights. In embodiments, the monocular architecture includes a 2D image recognition analysis combined with a 3D point cloud analysis, the 2D and 3D analysis combined using a series of artificial neural networks to perform three-dimensional object counting.

Various Embodiments and Components for Use Therewith

In view of the foregoing, there is a need for a system and method for three-dimensional objecting counting that addresses the problems and shortcomings of existing approaches to identifying, assessing, and determining the selection, quantity, and arrangement of items in a store or warehouse, including the depth-limitations of 2D image recognition-only and the same-shape challenges of 3D object detection-only approaches, as well as the costly, time-consuming manual determinations of product placement. There is a need for a system of three-dimensional object counting that provides increased visibility regarding product demand in order to provide actionable and quantifiable insights to a store or warehouse or to a salesperson.

Embodiments of the system and method for three-dimensional object counting of the present disclosure advantageously overcome the deficiencies of existing approaches to count, map, and identify objects in a space, such as products on a shelf, which are limited in accuracy and require tremendous time and effort to carry out.

In retail and inventory management settings, it has been found that certain aisles, such as of a grocery or department store, drive a disproportionately large volume of sales compared to other aisles. One such aisles is commonly referred to as the "action aisle" or "action alley." An example is the main aisle or walkway in a one-stop shopping center that divides the grocery section from, say, the home goods or apparel sections. Action aisles are frequently stocked with seasonal products, promotional items, and/or loss-leading products, as it has been found that shoppers frequently buy such products unexpectedly or impulsively under the perception that such products are on sale. For example, accoutrement for summer barbecues may be arranged in the action aisle leading up to a holiday such as Independence Day, while school supplies may be displayed leading up to the end of summer vacation.

Other important locations in a retail setting include end-caps (known as gondolas) at the ends of long rows of shelves, where items may be specially promoted or arranged. The "eye and buy" level of a shelf is considered more valuable real estate than lower or higher shelves, as consumers are less likely to notice and consider items located above or below their eyeline. Impulse areas, such as the shelves adjacent to checkout stands, are also an important location in a retail setting and are frequently stocked with candy, magazines, and cold drinks.

Because of the challenges of accurately counting three-dimensional objects using the existing 2D-only and 3D-only object-counting approaches, audits of retailer and inventory locations, such as stores and warehouses, are manually conducted, expensive, and often inaccurate, due to being poorly adapted to accurately assessing the depth of objects in a scene and to distinguishing between different objects that have a similar shape.

Further, audits of stores and warehouses are not capable of yielding actionable information regarding a selection, quantity, and arrangement of objects in a space, such as on shelves in a store or warehouse, while considering such details as sales data, seasonality, spatial data, competitive information, demographics, combinations thereof, and other details.

In an embodiment of the system and method, 2D image recognition and 3D point cloud scanning are synergistically combined to identify and count the number of objects in a display. The 2D image recognition assessment may be conducted using an image capture device configured to capture, store, and process an RGB image. The image capture device may be integrated with a mobile device, such as a tablet or mobile phone, and may cooperate with a mobile application configured to receive, store, process, and/or transmit the captured image.

A system and method for three-dimensional object counting leverages a 2D image and a 3D point cloud to count, map, and identify objects in a space, such as products on a shelf. The system and method include an image capture device configured to capture a 2D image, for example an RGB image, and a scanner, for example a LiDAR scanner, configured to generate a 3D point cloud. The image capture device and the scanner are integrated in a mobile device and configured to simultaneously capture 2D and 3D information that is processed using a novel architecture comprising distinct first, second, and third neural networks. The system and method mitigate the need to manually collect and provide three-dimensional bounding boxes in object detection.

The system and method embodiments may provide a replacement for inventory audits in varying tiers or levels of detail. In a first embodiment, the system and method provide a first phase of three-dimensional object counting that utilizes photo recognition to determine a share of visual inventory ("SOVI", such as a proportion of shelf or fridge facings for a brand or product across a particular category—for example, Coca-Cola® products as a fraction of soft drinks) for a location, such as a retailer or a warehouse. The first phase also determines a share of inventory ("SOI"), such as a proportion of shelf space, visible and not visible, of a product relative to other products in the category. The first phase includes a store- or warehouse-level 3D counting and inventory assessment and granular product category statistics. For example, the first phase, when implemented in a one-stop-shopping center, may determine a percentage of shelf space that is occupied by products of a particular brand compared to another, analogous brand, this metric termed a "micro SOVI."

The first phase utilizes a novel monocular architecture to synergistically combine image recognition with 3D point cloud analysis to conduct three-dimensional object counting at a display level. The objecting counting process includes capturing at least one 2D image of a product on a shelf or display using an image capture device, such as a digital camera, storing the image in a mobile application, and transmitting the captured image to a backend application. The captured and transmitted images are assessed to find and identify a label of the product.

The 2D image may be an RGB (i.e. red, green, blue) or truecolor image. Alternatively, the 2D image may be a cyan, magenta, yellow ("CMY") image, a cyan, magenta, yellow, key/black ("CMYK") image, a hue, saturation, and intensity ("HSI") image, an XYZ image, a UVW image, YUV, YIQ, or YCbCr image, a YDbDr image, a DSH, HSV, HLS, or HIS image, a Munsel color space image, a CIELuv image, a CIELab image, a SMPTE-C RGB image, a YES (Xerox) image, a grayscale image, a digital infrared image, or any other suitable type of image. In an embodiment, the system may utilize a rendered 3D image using voxel data, a voxel defining a 3D pixel of a volumized pixel obtained using a stereoscopic depth camera or other suitable image capture device. An exemplary depth camera is a Structure Sensor (Mark II) available from Occipital of Boulder, CO Labels that are identified with a confidence level below a predetermined confidence threshold are verified internally. The captured, transmitted, and identified images are entered into a dataset on any suitable basis, including a daily, weekly, biweekly, monthly, or other basis.

The image capture device and mobile application may be integrated or provided on a tablet such as an iPad®, mobile phone, or other device that an auditor may use. The at least one image of the product may necessarily be of a frontmost object on the shelf, as others of the same type of object may be arranged in any number behind the frontmost object on the shelf, but the labels thereof are normally not visible to the image capture device, hence the difficulty of ascertaining the quantity and arrangement of products or items using the existing image recognition-only approaches.

The datasets built using the identified images are used to train and retrain a machine learning model. Using identified images to populate datasets for training the machine learning model allows the method and system to be independent of third-party training sets, reducing costs of implementing the system and method. The machine learning model may be trained for image recognition in advance of use and retrained as necessary and/or desired by capturing an image or video of one or more objects as the object rotates before an image capture device, such as on a turntable. This advantageously allows the system and method to accurately detect an image, such as a label, SKU, or QR code, even if the object is rotated out of alignment with adjacent objects and/or out of alignment with a shelf or display. Further, the machine learning model is trained directly on item counts, as opposed to the 3D bounding boxes that are required in certain existing methods.

The machine learning model may advantageously base a determination of what objects, such as products, are arranged behind a frontmost object on the shelf of which the image is captured based on average values in the dataset for a particular store or warehouse, a particular region, a particular product or class of products, combinations thereof, or otherwise. The average values may represent an average percentage of objects behind the frontmost object that are different from the frontmost object, and/or an identity of the objects that are, on average, found behind the frontmost object due to consumers returning an object to the shelf improperly after changing their mind or due to stocking errors, for example. For example, the dataset may include an average value indicating that in a particular location, 5% of the objects behind each instance of a particular soft drink, are a different particular soft drink.

The objecting counting process further includes determining a 3D point cloud in conjunction with the image capture process. The 3D point cloud is obtained by conducting a terrestrial light detection and ranging (LiDAR) scan of at least one object at at least one display location, such as on a shelf, for the purpose of determining the number of objects. Whereas existing approaches to object counting utilize the aforementioned 3D object detectors such as those used for autonomous driving and which generate predictions of where the objects are in a scene, the system and method of the present disclosure advantageously detect how many objects of a class are in a scene.

The mobile device comprising the mobile application and the image capture device may further comprise or cooperate with a LiDAR scanner, such as a built-in LiDAR Scanner in the iPad Pro available from Apple Inc. of Cupertino, CA. Alternatively, the LiDAR scanner is provided and utilized separately from the mobile device. The LiDAR scanner may be a phase-based or a time-of-flight based LiDAR scanner such as available from FARO of Lake Mary, FL.

The LiDAR scan measures the contours of one or more objects, such as bottles, boxes, or other products, and from the LiDAR measurement a point cloud is assessed so as to detect the one or more objects. The LiDAR scan may be conducted simultaneously with the image capture process, such that image data and 3D point cloud information are both available for a particular object and particular location. Alternatively, the image capture process and the LiDAR scan may be conducted separately.

While a LiDAR scanner has been described, it will be appreciated that 3D information, such as a 3D point cloud, may alternatively be obtained by any suitable modality, such as radar, sonar, IR sensors, stereoscopic depth cameras, time of flight cameras, ultrasonic sensors, photogrammetry, a combination of a digital camera and an infrared camera, or any other scanning modality.

The first phase includes segmentation including demographic-driven store benchmarks, which may include or be assessed from sales data, seasonality, or otherwise. The first phase further provides photo-recorded proof of performance and reporting of non-performance for customer marking agreement ("CMA") compliance purposes.

The system and method may include and use a monocular architecture to synergistically combine 2D image recognition with a 3D point cloud imaging modality. The monocular architecture includes a neural network architecture, in which a first artificial neural network performs 3D localization of captured 2D images, a second artificial neural network performs abstractification of the 3D point cloud, and a third artificial neural network fuses the 2D and 3D information.

The mobile application and/or mobile device may be configured to conduct the above-mentioned and other steps described herein locally, in contrast to approaches in which analysis of captured images is performed remotely. The mobile device may comprise a storage, a processor, a power source, and an interface. Instructions on the storage may be executed by the processor so as to utilize one or more neural networks as described herein to capture a 2D image, capture a 3D point cloud, and perform object recognition and object counting using first and second artificial neural networks, with a third artificial neural network that synthesizes the 2D and 3D data to perform object counting without the need for manually applying bounding boxes to detected 3D object.

While in embodiments the above steps are performed locally on an edge device, it will be appreciated that one or more of the steps described herein may be performed by cloud computing, with 2D images and 3D point cloud information captured of a scene in a store or warehouse transmitted to a remote server, with a processor located on the remote server configured to perform object identification and object counting to identify and count three-dimensional objects.

In a second embodiment, the system and method provide a second phase of three-dimensional object counting that, in addition to providing SOVI, performs a display-level 3D counting and inventory assessment, in contrast to the store- or warehouse-level 3D counting and inventory assessment provided in the first phase. The second phase also provides granular product category statistics, including micro SOVI and SOI.

As with the first phase, the second phase includes segmentation including demographic-driven store benchmarks, which may include or be assessed from sales data, seasonality, or otherwise. The second phase further provides photo-recorded proof of performance and reporting of non-performance for CMA compliance purposes, as with the first phase.

The second phase provides, beyond the first phase, store mapping, including indicating the location and adjacency of displays. The second phase also provides spatial reporting that indicates sales at a display level.

Store or warehouse mapping and spatial reporting may utilize spatial awareness data captured using a suitable scanning modality, such as a LiDAR scanner. The LiDAR scanner for gathering spatial awareness data may be a phase-based or a time-of-flight based LiDAR scanner such as available from FARO of Lake Mary, FL. Alternatively, one or more stereoscopic cameras may be used to gather one or more images from a suitable angle to determine one or more features of a store or warehouse.

In embodiments, the mapping scanner may be the same scanner as used for obtaining 3D information, such as a 3D point cloud. In other embodiments, the mapping scanner may be a separate scanner utilizing a different modality. While a LiDAR scanner has been described, it will be appreciated that the mapping scanner may be any scanning modality such as radar, sonar, IR sensors, stereoscopic cameras, ultrasonic sensors, photogrammetry, a combination of a digital camera and an infrared camera, or any other scanning modality.

In a third embodiment, the system and method provide a third phase of three-dimensional object counting that, in addition to providing SOVI, store- or warehouse-level 3D counting and inventory assessment, micro SOVI, SOI, segmentation, proof of performance, store mapping, and spatial reporting as with the first and second phases, a generated display configuration. The display configuration is determined on the basis of one or a combination of sales data, demographics data, seasonality, adjacencies, and other factors.

The 2D image recognition assessment may be a 2D object detection model that treats image classification as a regression problem, conducting one pass through an associated neural network to predict what front-facing objects are in the image and where they are present. This is used to construct a 2D representation of a captured scene. The 2D object detection model may be any of the YOLO family, including the YOLOv1, YOLOv2, or YOLOv3 models available from Joseph Chet Redmon of the University of Washington or the YOLOv5 model available from Glenn Jocher, the Faster R-CNN model available from Shaoqing Ren, the RetinaNet model available from Tsung-Yi Lin, the R-FCN model available from Jifeng Dai, the MultiBox model available from Christian Szegedy, the SSD model available from Wei Liu, or any other suitable model.

3D object detection is performed using a 3D point cloud assessment conducted using a LiDAR scanner, such as an integrated LiDAR Scanner in the mobile device, to assess scene depth. The detected scene depth advantageously complements the RGB images of the 2D object detection conducted by the 2D object detection model. The 3D object detection process localizes and classifies objects in 3D space.

Given a set of object classes, denoted $c_i \in C$, where $C=\{c_i: 0<1<=c\}$, the system and method provide a function $f(I, P, \Psi)$ that maps jointly from an RBG image, I, obtained using the image capture device, and a point cloud P, obtained using the 3D scanner, to a vector of object counts $\hat{y} \in \mathbb{R}^{(c \times 1)}$ with parameters $\psi$. The ith element of $\hat{y}$ denotes the predicted count of objects $c_i$.

FIG. 1 is a diagram of a system 100 for three-dimensional object counting according to an embodiment of the present disclosure. The system 100 utilizes three distinct artificial neural networks 110, 120, 130 for synthesizing 2D images, for example RGB images 102, and 3D point cloud data 112, to generate a predicted count of objects in a detected scene. The first neural network 110 performs object detection on a single image and outputs a set of coordinates that define bounding boxes and labels for each object identified in the image.

The first neural network 110 may be a pre-trained object detector model with fixed weights that are not updated during training. The images captured by the image capture device may be fed directly into the first neural network 110, the captured images defined as a three dimensional tensor with dimensions (k×w×h), where k is the number of channels, w is the width, and h is the height. A sequence of images 102 is collected for any given scene in which objects are to be counted. The first neural network 110 may operate according to Equation 1 below:

$$O, C, x = g(I; \theta) \qquad \text{Equation 1}$$

In Equation 1, I is an image tensor. The bounding boxes generated by the first neural network 110 are used to define the area of each identified product in the scene, and to generate and project object centroids 106 in 3D space using a corresponding simultaneous localization and mapping (SLAM) algorithm 104 and a LiDAR sensor. The bounding boxes are represented by <x, y> coordinates.

From predicted class labels generated by the first neural network 110 for the objects identified in the images, a one-hot matrix is constructed, where each row i is a one-hot vector corresponding to the class label of the ith object in the images. The one-hot matrix is denoted by Equation 2 below:

$$O \in \mathbb{R}^{n \times c} \qquad \text{Equation 2}$$

The center of each object, or the centroid, is computed using the coordinates from the generated bounding boxes. The centroids are then projected into 3D space with the SLAM algorithm and the LiDAR sensor. SLAM is configured to track the position of the image capture device, in particular the mobile device with which the image capture device is integrated, and the relative locations of each detected object. From the location data, SLAM projects the 2D centroids into 3D space in substantially real time.

The set of centroids are concatenated to a matrix defined according to Equation 3 below, in which n is a predefined maximum number of objects that can be found in the scene.

$$C \in \mathbb{R}^{n \times 3} \qquad \text{Equation 3}$$

The second neural network 120 extracts 3D features 114 of a scene captured by LiDAR. The LiDAR scan may advantageously be conducted simultaneously with an image capture process to capture the images 102 and may yield a point cloud 112. The point cloud 112 is a set of three-dimensional points describing a scanned scene. The input dimensions of a point cloud are m×3, where m is the maximum allowable points and the three columns correspond to <x, y, z> tuples respectively.

While an integrated LiDAR scanner is described, the point cloud may also be obtained using stereoscopic cameras, time-of-flight cameras, combinations thereof, or any other suitable imaging modality. In embodiments, the LiDAR scan may be performed before or after the image capture process. The 3D features 114 extracted from the point cloud may indicate the depth and shape of objects in a scene. The second neural network 120 may be a deep neural network such as PointNet or PointNet++ available from Stanford University of Palo Alto, CA, EdgeConv available from MIT of Boston, MA, FeaStNet available from University of Grenoble Alpes of Grenoble, France, or any other suitable neural network.

In an embodiment, the system is configured to determine depth information directly from the 2D image. The second neural network 120 is trained and configured to predict depth and 3D features 114 from the 2D image.

The point cloud 112 is a set of <x, y, z> points that are represented as a matrix as shown in Equation 4 below, in which m is a predefined maximum number of points:

$$P \in \mathbb{R}^{m \times 3} \qquad \text{Equation 4}$$

After scaling the columns of the point cloud P 112 to have zero mean and unit variance, it is fed into the second neural network 120 to extract relevant scene features, including a high-level 3D feature vector of the scene. The vector is defined according to Equation 5 below, wherein a is the size of the final layer of the second neural network 120:

$$h_p \in \mathbb{R}^{a \times 1} \qquad \text{Equation 5}$$

The vector, then, is a function of the second neural network 120 and the point cloud P 112 represented by Equation 6:

$$h_p = p(P; \Psi) \qquad \text{Equation 6}$$

The third neural network 130 utilizes the object centroid data 106 and the extracted 3D features 114 to project the SLAM output, detected objects, and 3D features into a unified, latent space for objecting identification and counting, leveraging the benefits of 2D image recognition of labels using RBG imagery and 3D point cloud information. The output 140 is used infer object counts in the scene by first identifying distinct objects in the scene and then count the distinct objects in the 3D space. The third neural network 130 may have any suitable architecture. In embodiments, the process of utilizing the object centroid data 106 and the extruded 3D features 114 is performed by one or more regressors that are configured to predict counts from the 2D and 3D inputs, including one or more of the XGBoost, random forest, and linear regression varieties.

In particular, the third neural network 130 is configured to leverage 3D points generated by the SLAM algorithm and latent representations from the second neural network 120 to infer object count in a scene. The third neural network 130 uses a multi-layer perceptron $f(\bullet; \Psi)$ to process the output from the first neural network 110 and the second neural network 120. The third neural network 130 operates according to Equations 7-13 as shown below:

$$\hat{y} = f(C, O, h_p, x, m; \Psi) \qquad \text{Equation 7}$$

$$\hat{y} = \Psi_5[h_3, x] \odot m \qquad \text{Equation 8}$$

$$h_3 = \alpha(\Psi_4 h_2) \qquad \text{Equation 9}$$

$$h_2 = \alpha(\Psi_2 h_1) \qquad \text{Equation 10}$$

$$h_1 = \alpha(\Psi_1 [h_p, h_c]) \qquad \text{Equation 11}$$

$$h_c = \alpha(W[C, h_e]) \qquad \text{Equation 12}$$

$$h_e = \Omega O \qquad \text{Equation 13}$$

In the above operations, $\hat{y} \in \mathbb{R}^{c \times 1}$ is a vector of predicted counts, as m is a multi-hot masking vector denoting all objects identified in the object detection layer. The function $f(\bullet; \Psi)$ is an embedding layer followed by the three-layer neural network comprising the first, second, and third neural networks 110, 120, 130. The embedding layer in the function $f(\bullet; \Psi)$ followed by Equation 13 is an object embedding matrix, $\Omega$ that object representations, $h_e$ from O. This allows the three-layer neural network to understand object-specific semantics.

Next, the centroid matrix C is concatenated with the object embeddings $h_e$ and then multiplied by weights W. Three hidden layers then process the scene information. In Equation 11, the latent point-cloud representation $h_p$ with 2D data representation $h_p$. This is then passed into the three-layer multi-layer perceptron (MLP). The latent vector $h_i$ denotes the ith hidden layer of the MLP, and $\alpha(\bullet)$ is the ReLU activation function.

Finally, the final representation vector $h_3$ from the MLP is masked by m, which filters out the classes of products that were not found in the original scene to produce the final predictions vector $\hat{y}$.

The system and method avoid the need to manually provide 3D bounding boxes, as may be necessary in existing approaches, by providing a custom loss function trained directly to infer counts, as shown below in Equation 14:

$$\mathcal{L}(y, \hat{y}, m) = \frac{\sum_{i=1}^{c}(y - \hat{y}_i)^2}{\sum_{i=1}^{c} m_i} \qquad \text{Equation 14}$$

The loss function of Equation 14 is a masked MSE loss in which objects detected from visual information are leveraged to adjust an error estimate at each training step. The vector $\hat{y}$ is multiplied by a mask vector to ensure that the model only predicts counts for objects that are visually identified. The denominator of Equation 14 similarly ensures that only the non-zero components of $\hat{y}$ contribute to the loss. By contrast, a standard MSE would bias loss estimates towards objects that do not appear in the scene.

Figure 2A:
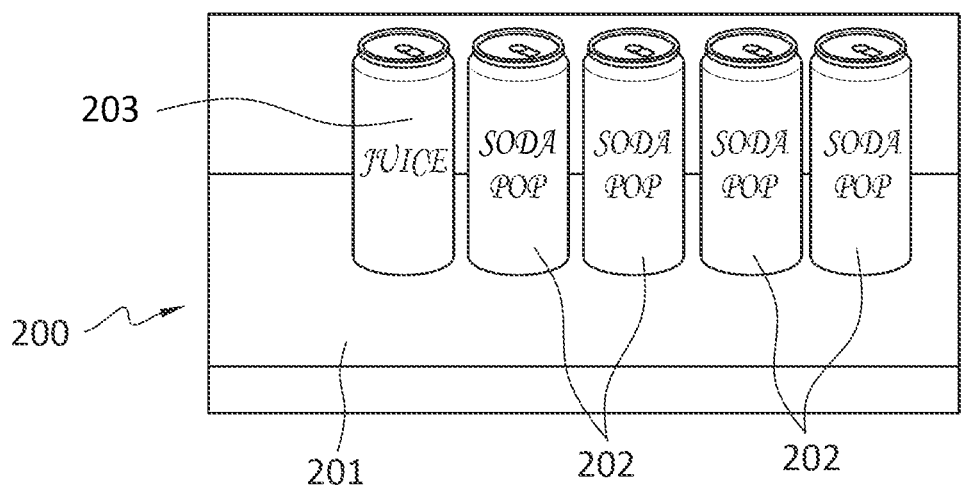
FIG. 2A is a perspective view of a constructed 3D scene in a three-dimensional object counting process according to the embodiment of FIG. 1.
Figure 2B:
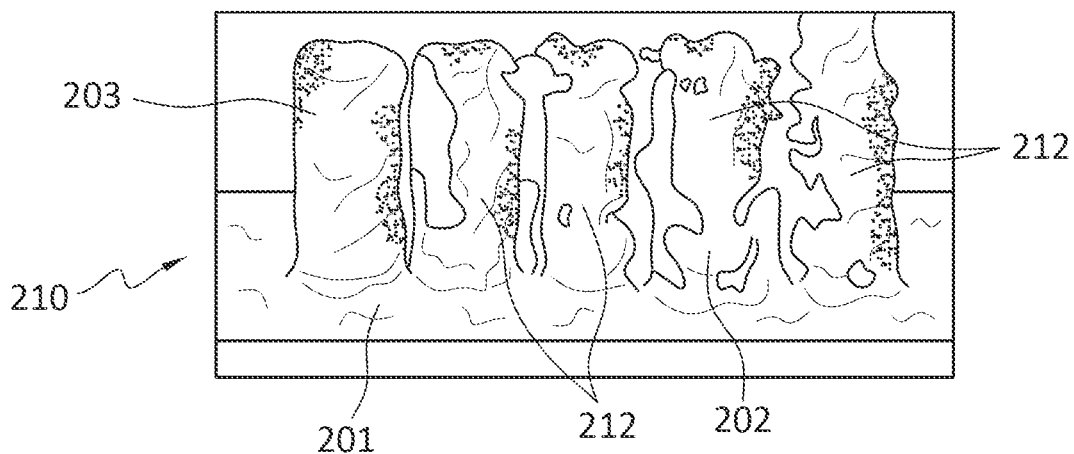
FIG. 2B is a perspective view of a 3D point cloud captured in the three-dimensional object counting process of FIG. 2A.
Figure 2C:
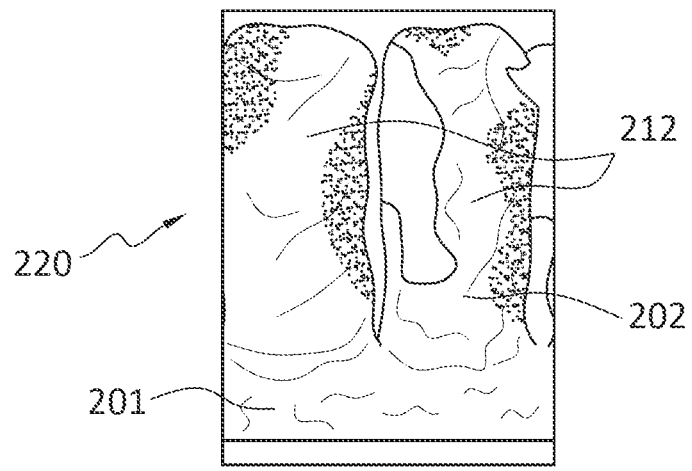
FIG. 2C is a close-up perspective view of a SLAM algorithm-generated projection of 2D centroids into 3D space according to the three-dimensional object counting process of FIG. 2A.

FIGS. 2A-2C are a perspective view of a three-dimensional object counting method according to an embodiment of the present disclosure. FIG. 2A shows an image 200, which may be a perspective RGB image captured by the image capture device of embodiments. In the image 200, a shelf 201 is shown on which one or more detectable objects 202, 203 are arranged. The detectable objects 202, 203 may be of a similar shape but of a different variety, such as different flavors of a same brand and size of soft drink. One of the detectable objects 203 may be of a different type than a plurality of other detectable objects 202, which may be of a same type.

A 3D scene 210 in FIG. 2B is constructed of the detected objects 202, 203. Centroids 212 of the detected objects 202, 203, points representing the center of each of the objects, may be identified using a SLAM algorithm and a LiDAR sensor in the 3D scene 210. The SLAM algorithm advantageously tracks the position of the mobile device and the locations of each of the objects to provide the location data for locating the centroids 212 relative to the objects 202, 203. The close-up view in FIG. 2C shows a close-up view of a SLAM algorithm-generated projection of 2D centroids into 3D space in real-time.

Figure 3:
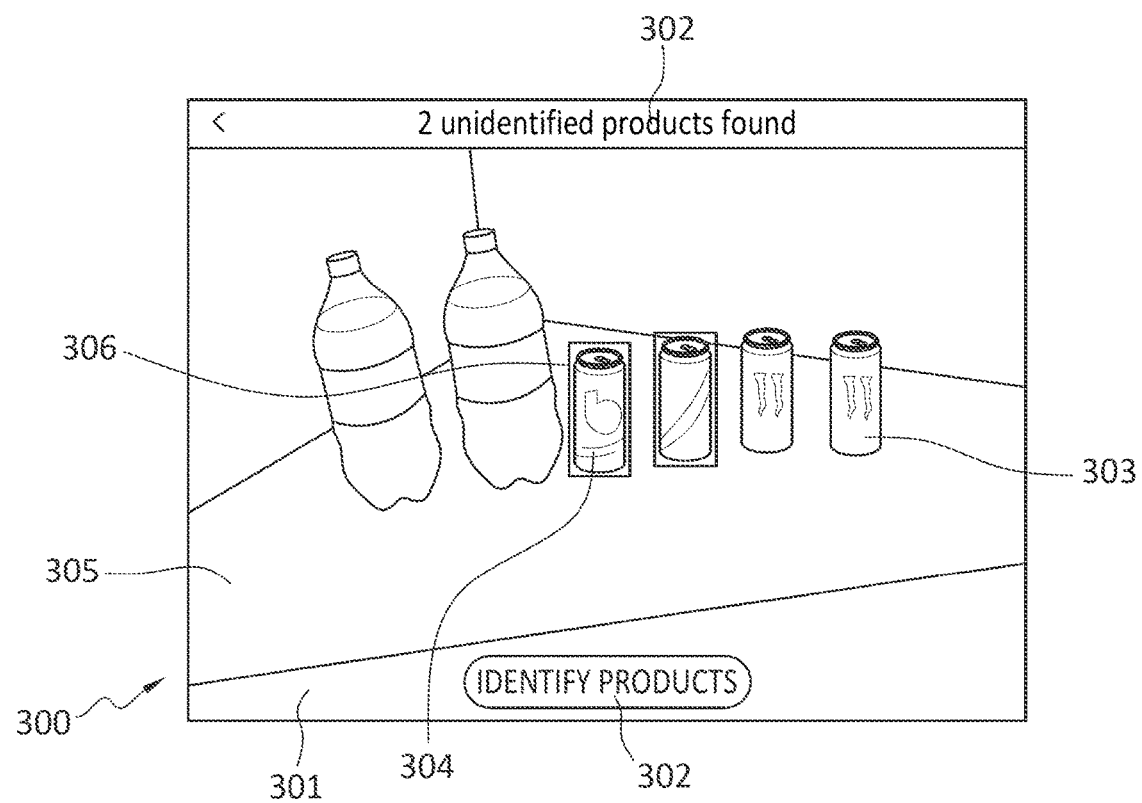
FIG. 3 is an elevational view of a display of a user interface in a system for three-dimensional object counting according to the embodiment of FIG. 1.

Turning to FIG. 3, a display 300 is shown of a mobile device cooperating with a system for three-dimensional object counting according to an embodiment, on which is displayed a user interface 301. The system may utilize both 2D images and 3D object recognition as described above regarding the embodiment of FIG. 1 to identify objects in a location, such as products on a shelf. The analysis is conducted locally and in substantially real time, such that a user with a mobile device is able to scan the shelves of an area of interest in, for example, a store or warehouse to identify the products located therein. The user interface 301 may comprise one or more status indicia/options 302 indicating a status of an object recognition process and/or prompting a user to proceed with a separate stage of analysis, for example to manually identify products that have not been identified by the system with a sufficiently high degree of confidence. In the embodiment of FIG. 3, an image captured of products 303, 304 on a shelf 305.

One or more of the products 303 may be identified with a level of certainty about a predetermined confidence threshold, whereas one or more products 304 may not exceed the predetermined confidence threshold. A bounding box 306 may be applied around one or more of the products, such as the products 304 regarding which further action may be needed. A user may be notified by the user interface 301 of products 304 that have not been identified about the confidence threshold and prompted to manually identify the products 304. This may be a feature of the system both during a training phase of the system and in standard use. For example, the products 304 may be new products that have not been observed previously and not populated into a dataset of the system.

The embodiment of FIG. 3 may be available for a first phase, a second phase, and a third phase of the system and method.

Figure 4A:
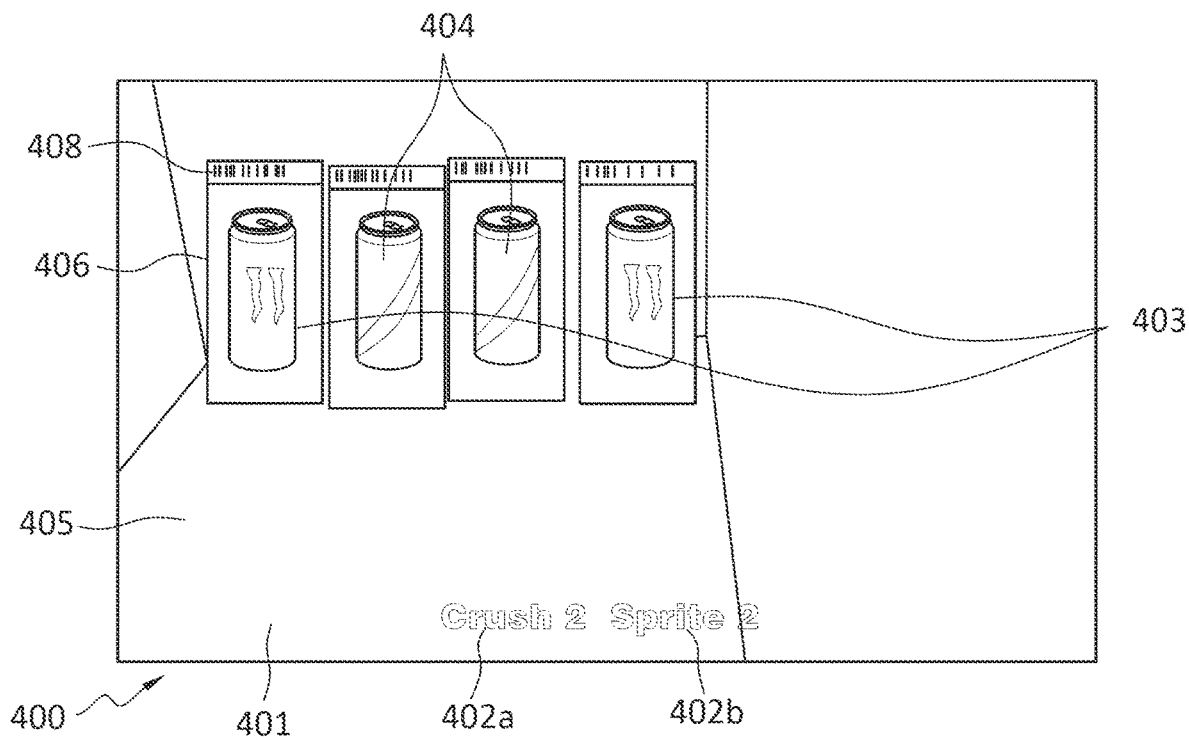
FIG. 4A is an elevational view of a display of a user interface in a system for three-dimensional object counting according to the embodiment of FIG. 1.

Turning now to FIG. 4A, a display 400 is shown of a mobile device cooperating with a system for three-dimensional object counting according to an embodiment, on which is displayed a first screen 401 of a user interface. As with the embodiment of FIG. 3, the system may utilize both 2D images and 3D object recognition as described above regarding the embodiment of FIG. 1 to identify objects in a location, such as products on a shelf. The system may identify one or more objects 403, 404 on a shelf 405. The objects 403 may be of a first product type and the objects 404 may be of a second product type.

The user interface 401 may provide indicia 402a, 402b corresponding to the identified objects 403, 404, respectively, indicating to the user that a class of the products 403, 404 has been correctly identified and allowing the user to make manual corrections if necessary. For example, while two classes or types of products 403, 404 are identified among the four total objects identified on the shelf 405, the system may indicate if other classes or types of products are present. The system applies a bounding box 406 surrounding one or more of the products 403, 404, with an indicium 408 corresponding to one or more of the products 403, 404.

Figure 4B:
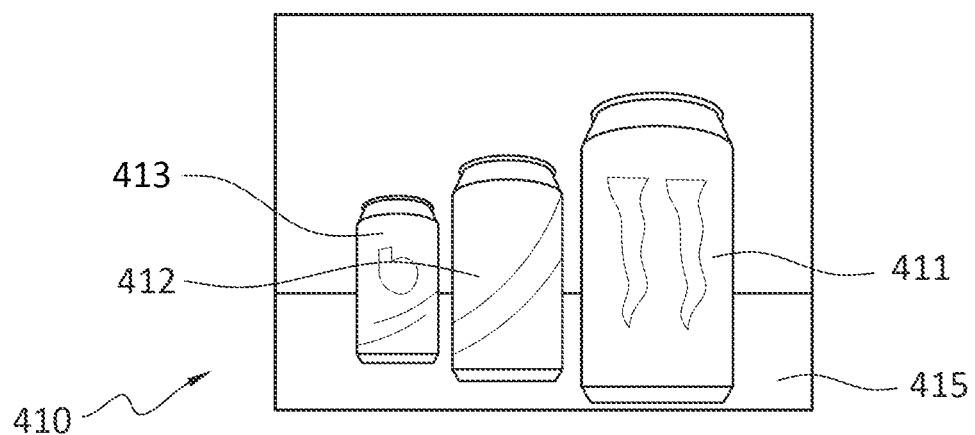
FIG. 4B is a perspective view of a 2D image captured by the system of FIG. 4A.
Figure 4C:
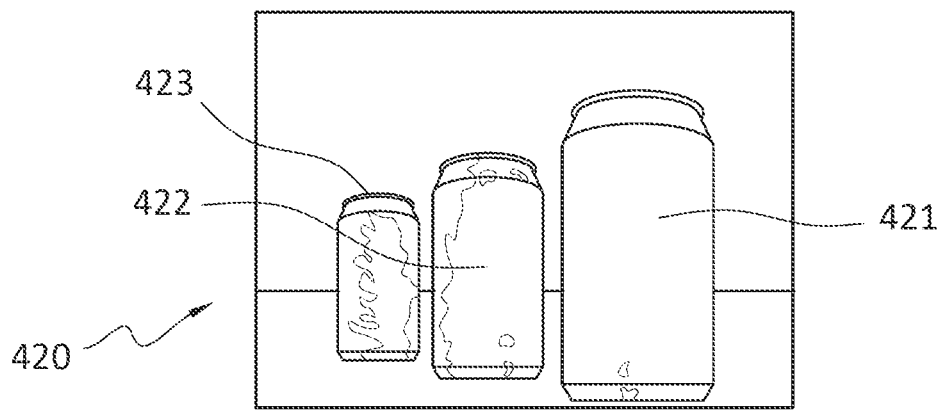
FIG. 4C is a perspective view of objects within a 3D scene determined from the 2D image of FIG. 4B.

The embodiment of FIG. 4A may correspond to a second phase and second embodiment of the system and method, in which a user may further correlate the identified products 403, 404 with a store map, display location, adjacencies, display level sales data, restocking data at the display, QR or other SKU code displays, combinations thereof, or other information as suitable. FIG. 4B is a 2D image 410 captured using an image capture device of a system according to the disclosed embodiments. Within the 2D image 410 are one or more objects 411, 412, 413 arranged on a shelf 415, each of the objects 411, 412, 413, while having a similar 3D shape, belonging to a different product class or variety. FIG. 4C shows a 3D scene 420 of the 2D image 410 determined using a system according to the disclosed embodiments. In the 3D scene 420, the objects 411, 412, 413 are identified as objects 421, 422, 423, demonstrating the ability of the system and method embodiments to distinguish objects on a shelf from 2D images captured at different angles.

Figure 4D:
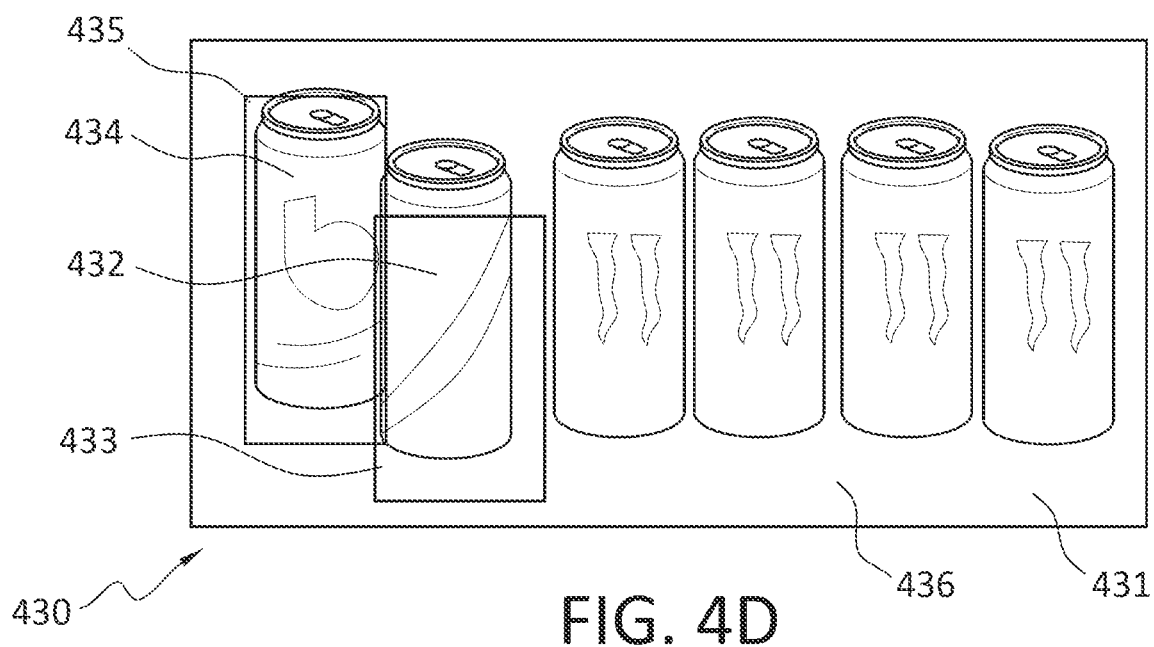
FIG. 4D is a perspective view of another 2D image captured by the system of FIG. 4A.

FIG. 4D shows another example of a 2D image 430 captured using a system and method for three-dimensional object counting. Shown in the 2D image 230 are a plurality of objects 431, 432, 434 arranged on a shelf 436. While certain of the objects 431 may be of a same type or variety, others of the objects 432, 434 may be different objects, and may be specially identified by bounding box labels 433, 435, respectively. The embodiment of FIG. 4D may be advantageous for embodiments in which objects that are misplaced on a shelf are located and pointed out to a user, and/or in embodiments in which a new variety of object is identified by the system.

Figure 4E:
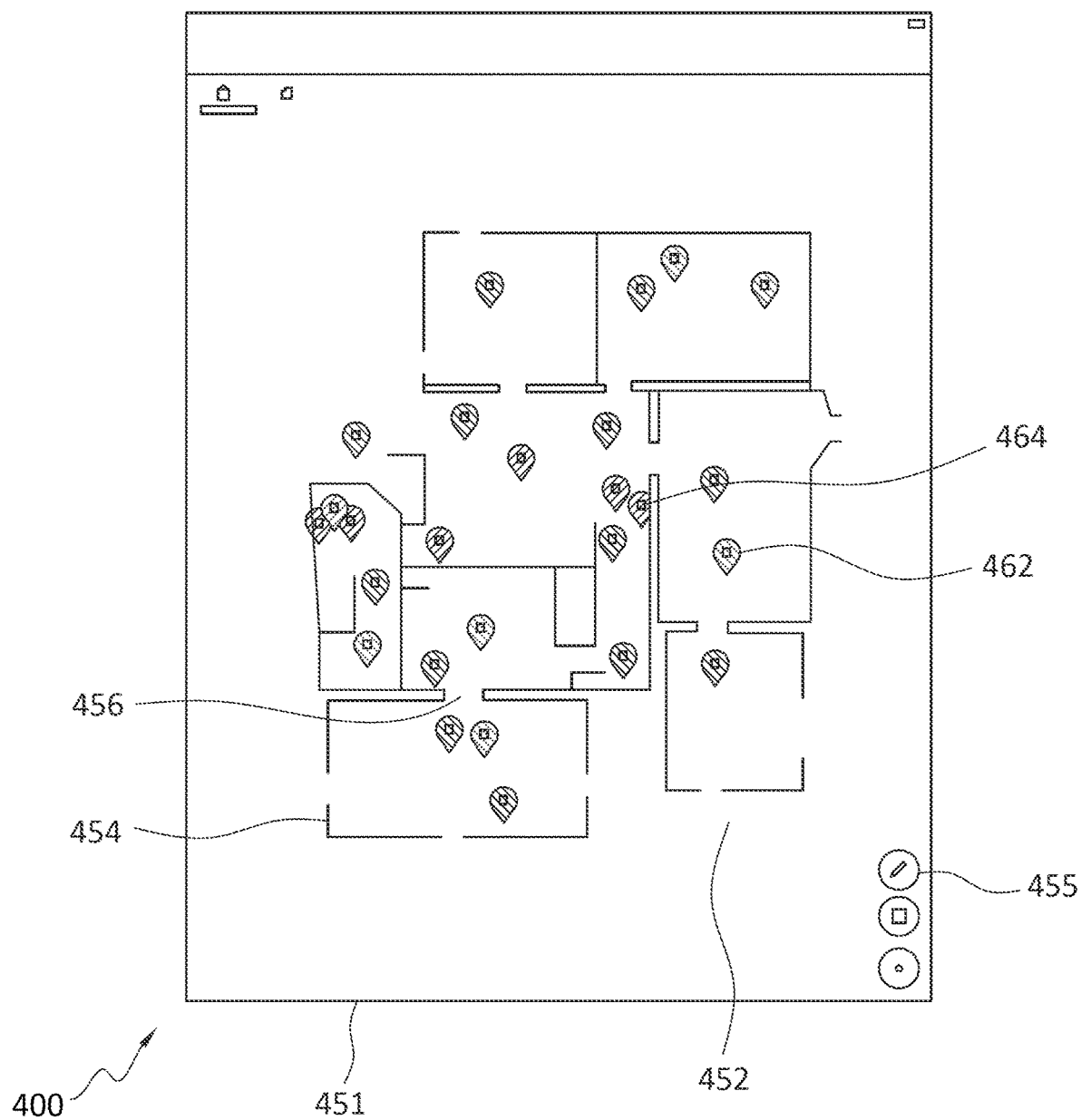
FIG. 4E is an elevational view of a display of a user interface in a system for three-dimensional object counting according to the embodiment of FIG. 4A.

Turning now to FIG. 4E, the display 400 is shown of the mobile device, on which is displayed a second instance or screen 451 of the user interface. The second screen 451 shows a map 452 of the store or warehouse in which the system and method are being used. The map 452 includes one or more boundary markers 454 and openings 456 showing sections or rooms of the store or warehouse and doors or passages therebetween.

The map 452 further comprises one or more location indicia 462, 464 that show a location and a color. The indicia 462 have a first color and the indicia 464 have a second color. The different colors indicate to a user the location and density, proportion, profitability, combinations thereof, or any other suitable statistic of a product. The map 452 may be determined on the basis of the location data obtained during the object counting process, for example using the LiDAR scanner. The number of objects identified using the system and method may be used to populate the map 452, indicating to a user where a certain product is and/or should be located for improved sales. Options 455 of the user interface allow a user to manually edit information displayed on the interface, toggle between different display options, make notes, or otherwise.

Figure 4F:
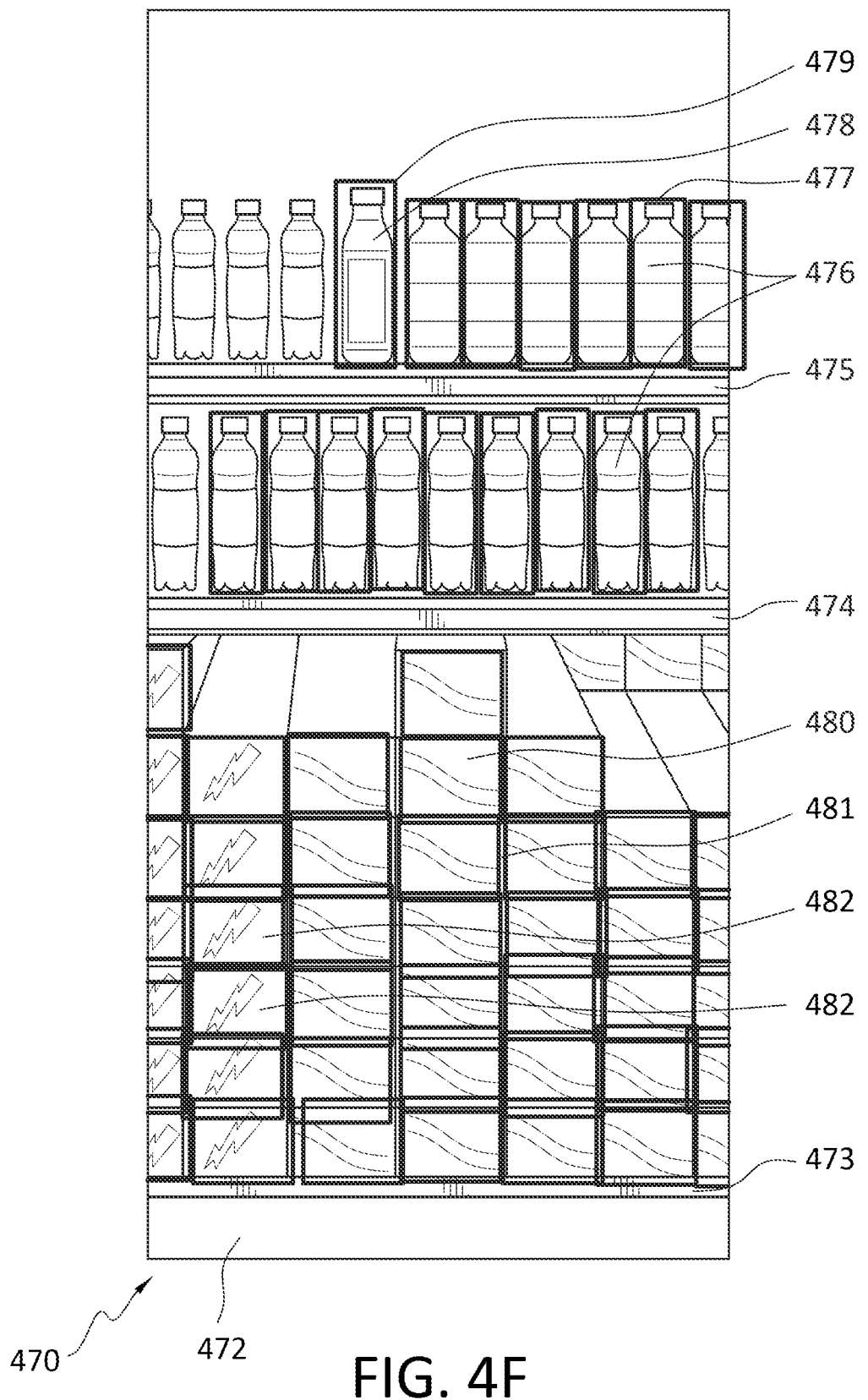
FIG. 4F is a perspective view of a labeled 2D image captured and processed by the system of FIG. 4A.

FIG. 4F shows an example of a labeled 2D image according to an embodiment. The image 470 captures a scene 472 including one or more shelves 473, 474, 475, arranged vertically, The image 470 shows one or more products 476, 478, 480, 482, which are identified according to the embodiments and labeled with a label 477, 479, 481, 483, respectively. The system and method embodiments are configured to receive a 2D image of a scene 472, identify one or more objects 476, 478, 480, 482 within the scene, and to label the objects according to the variety of identified object.

The labels 477, 479, 481, 483 may have a color, thickness, or other indicium that corresponds to an identified product. The system is further configured to identify objects arranged in stacks as shown on the shelf 473, located adjacent to each other as shown on the shelves 474, 475, and arranged behind each other, due to the combination of 2D image and 3D point cloud data, which allows the system to detect layers of objects not visible from the 2D image.

Figure 5A:
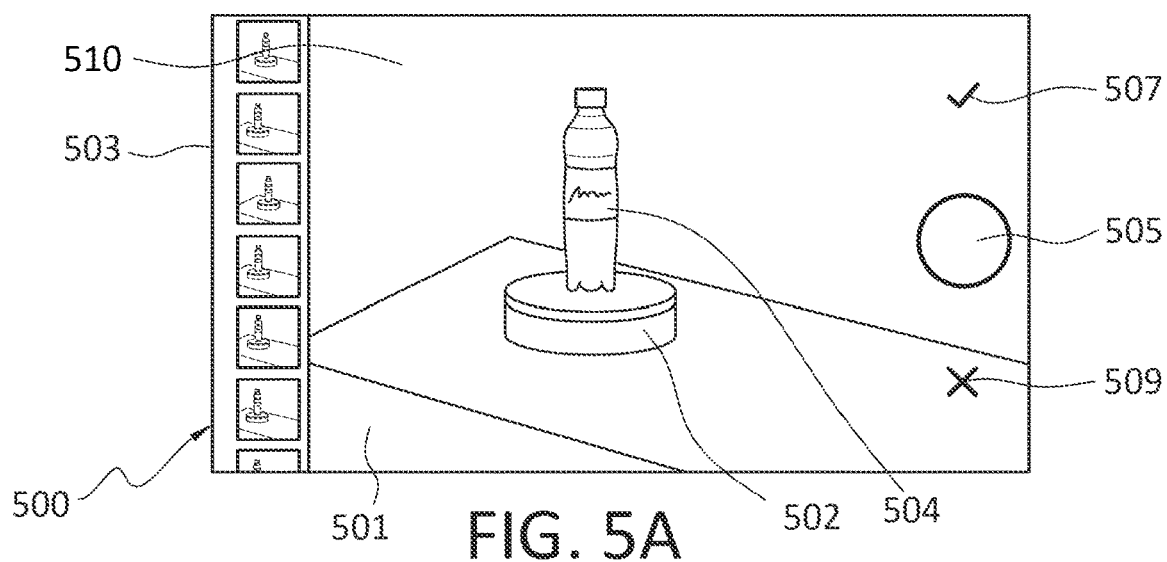
FIG. 5A is an elevational view of a display of a user interface in a system for three-dimensional object counting according to the embodiment of FIG. 1.
Figure 5B:
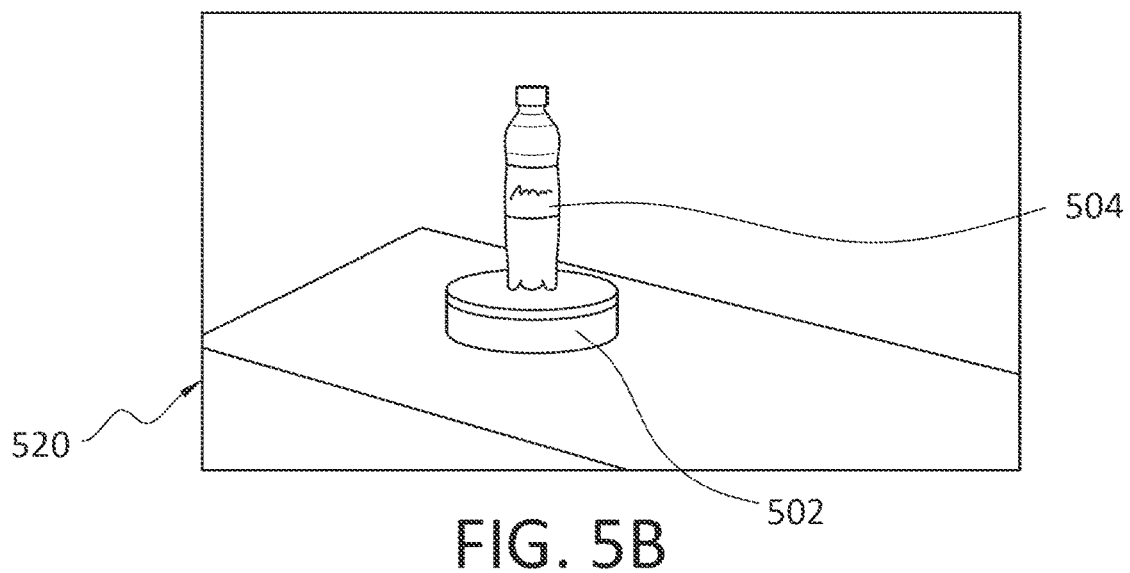
FIG. 5B is an elevational view of a captured image captured using the system according to the embodiment of FIG. 5A.
Figure 5C:
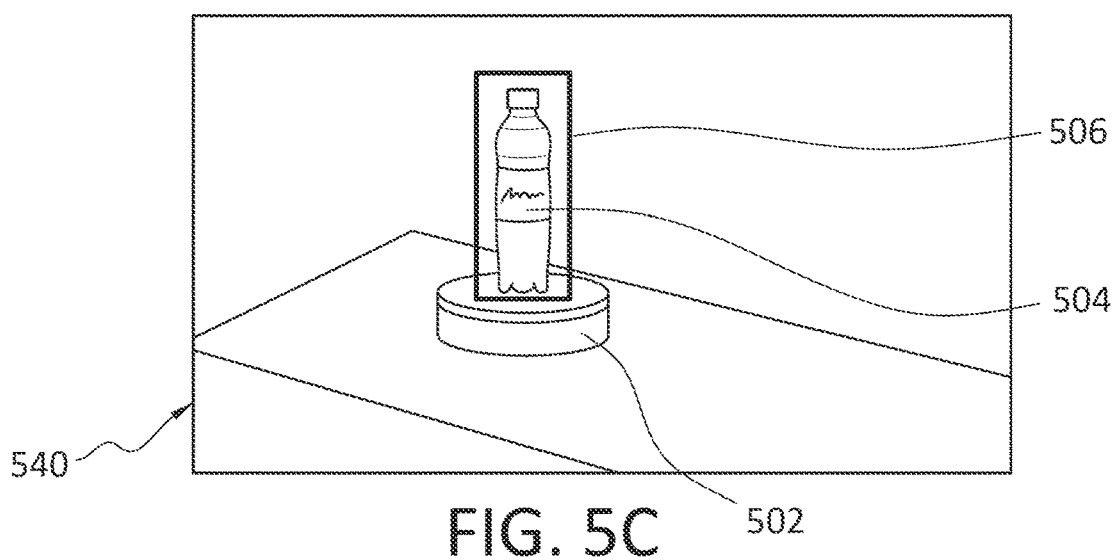
FIG. 5C is an elevational view of a labeled image labeled using the system according to the embodiment of FIG. 5A.

A method and system for three-dimensional object counting according to an embodiment is illustrated regarding FIGS. 5A-5C. A display 500 is shown of a mobile device cooperating with a system for three-dimensional object counting according to an embodiment, on which is displayed a first screen 501 of a user interface. The user interface is configured for capturing an image of at least one object 504, such as a product, of interest.

The object 504 may be placed upon a stand 502. In embodiments the stand is configured to rotate to facilitate capture of a plurality of images, such as of a label of a product, from different angles. The user interface may include a button or option 505 for executing an image capture process, a button or option 507 for accepting the captured image, and a button or option 509 for rejecting the captured image. A user may elect to accept the captured image if the object 504 is captured and/or if a desired portion, such as a label of the object 504, is visible.

An image reel 503 can be shown alongside a viewfinder window 510 of the first screen 501. The mobile device is configured to transmit the accepted images to a processor for analysis. The processor may be local, i.e. a processor of the mobile device, or remote, i.e. located at a remote server connected to the mobile device by any suitable communication modality.

A transmitted image 520 as shown in FIG. 5B is downloaded and labeled by the processor. The processor may apply a label 506, such as a bounding box, about an identified object 504 to output a labeled image 540 as shown in FIG. 5C. The labeled image 540 may be automatically assigned a confidence level by the processor indicating the level of confidence in the label. Images that receive a level of confidence below a predetermined threshold may require internal or manual validation by a user.

Figure 5D:
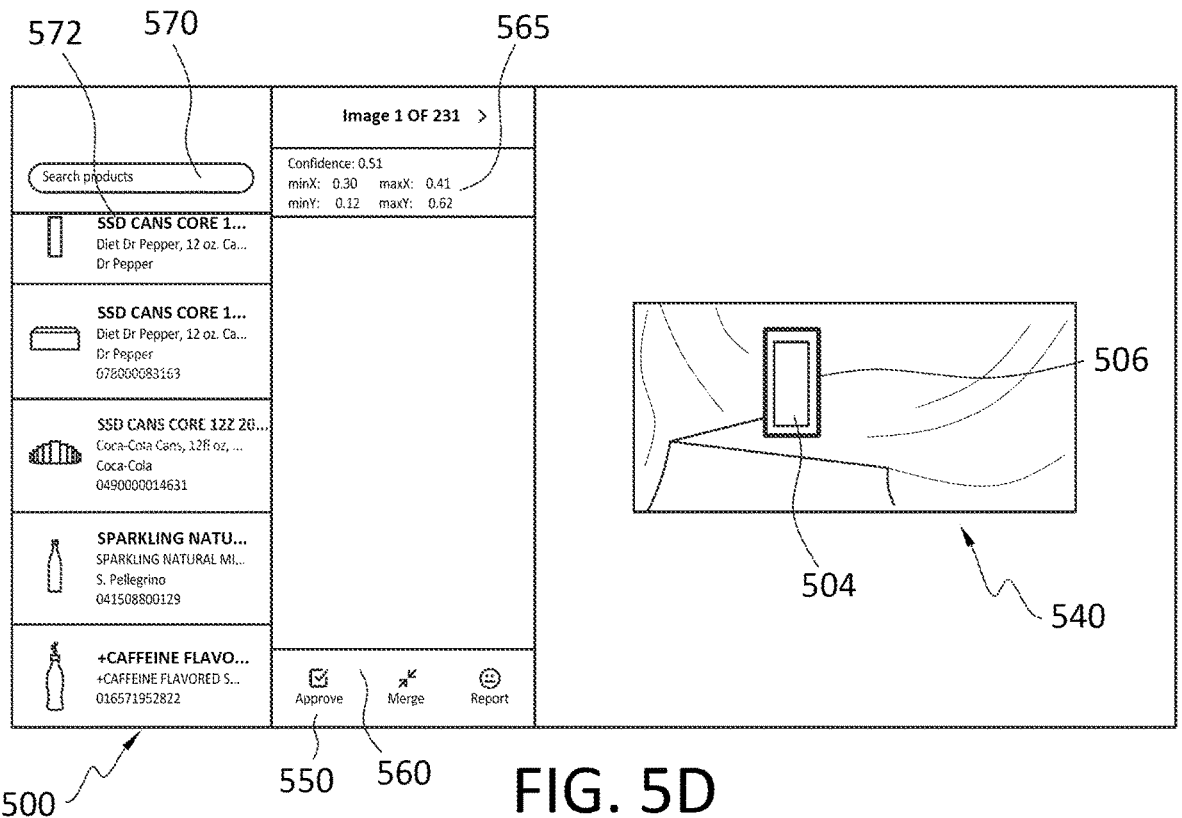
FIG. 5D is an elevational view of a display of a user interface in the system according to the embodiment of FIG. 5A.

Turning to FIG. 5D, a second screen 550 of the user interface shown on the display 500. The second screen 550 relates to internally validating labeled images, particularly when the images have a low confidence level. The second screen 550 may comprise a button or option 560 that allows a user to approve, report, alter, or otherwise address a labeled image. In embodiments, where a labeled image 540 is automatically assigned a low level of confidence, the user may view the labeled image 540, view the confidence level 565, and then approve or adjust the confidence level, label, or otherwise to validate the label. The second screen 550 may include a list 570 of labeled images 572 to be internally validated.

Figure 5E:
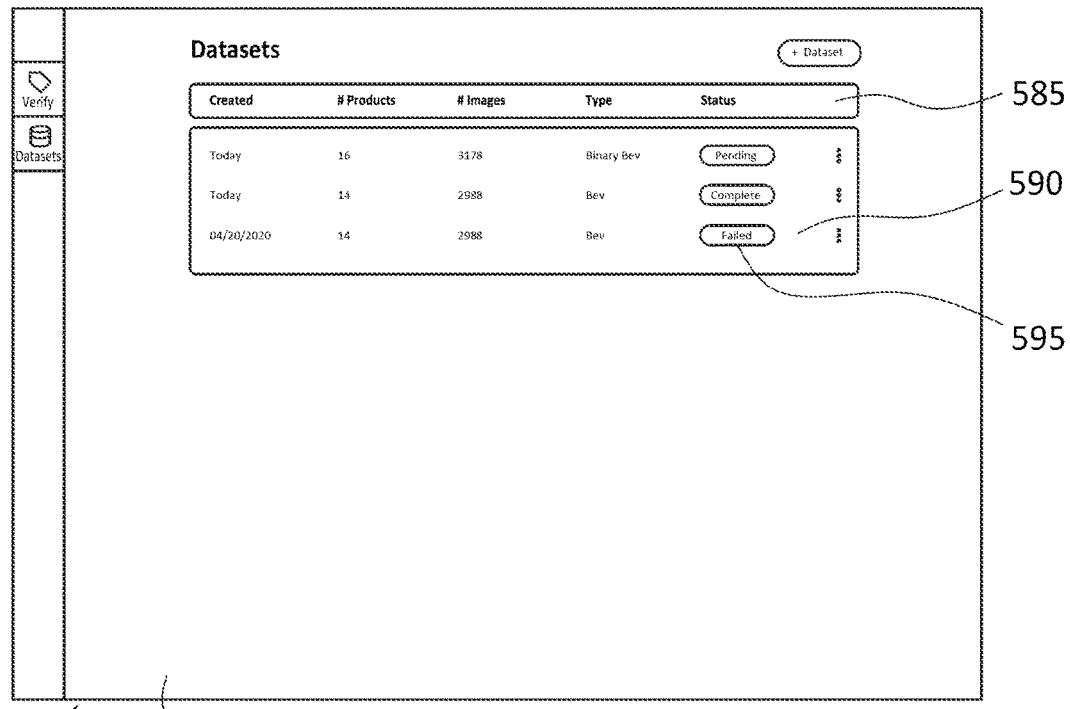
FIG. 5E is an elevational view of a display of a user interface in the system according to the embodiment of FIG. 5A.

Turning to FIG. 5E, a third screen 580 of the user interface displayed on the display 500 includes a list 585 of datasets 590. On any desired basis, such as daily, weekly, bimonthly, or based on a predetermined number of labeled images processed by the system, new datasets 590 may be generated and populated with labeled and verified photos. The datasets 590 may be used for training and retraining one or more of the neural networks described above regarding the embodiment of FIG. 1. One or more indicia 595 may indicate a status of a dataset 590 in the list 585, such as pending, complete, failed, or otherwise. The system and method embodiment of FIGS. 5A-5E advantageously mitigates the need to rely on third party labeling of images in a dataset and training of any artificial intelligence models, thus saving costs and improving accuracy.

Figure 6A:
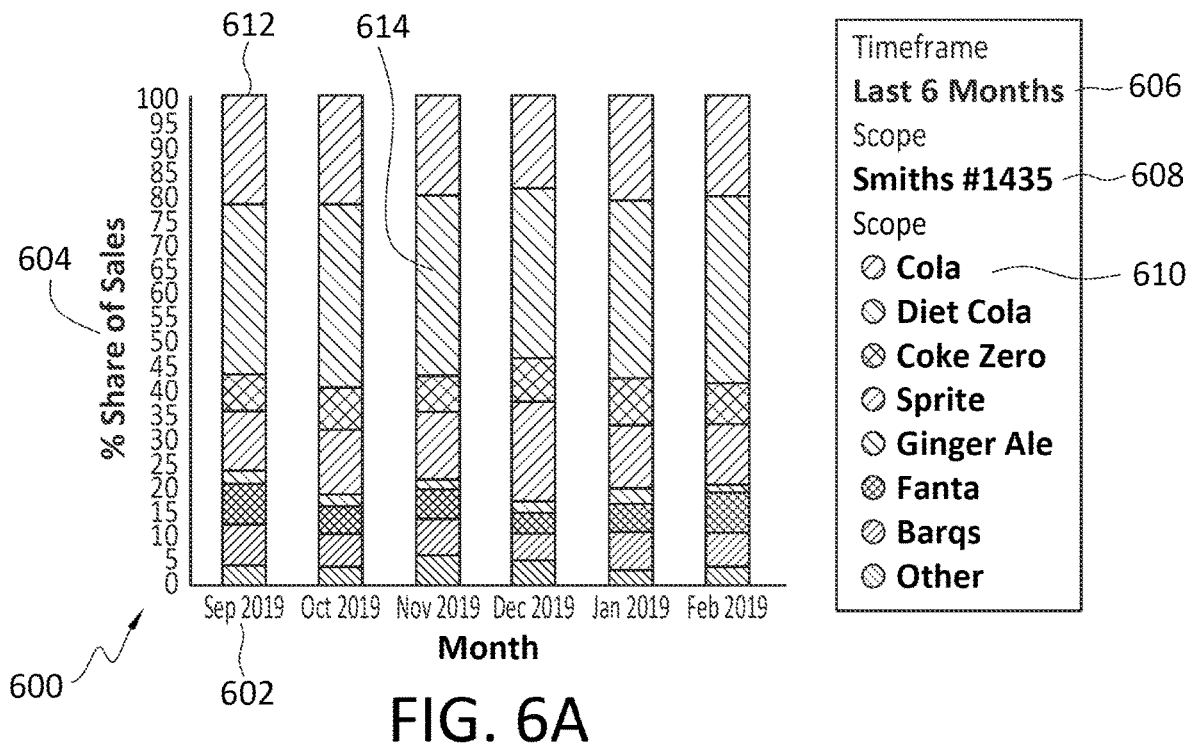
FIG. 6A is a graph of product sales data including percent share of sales vs. time used in cooperation with a system for three-dimensional object counting according to the embodiment of FIG. 1.
Figure 6B:
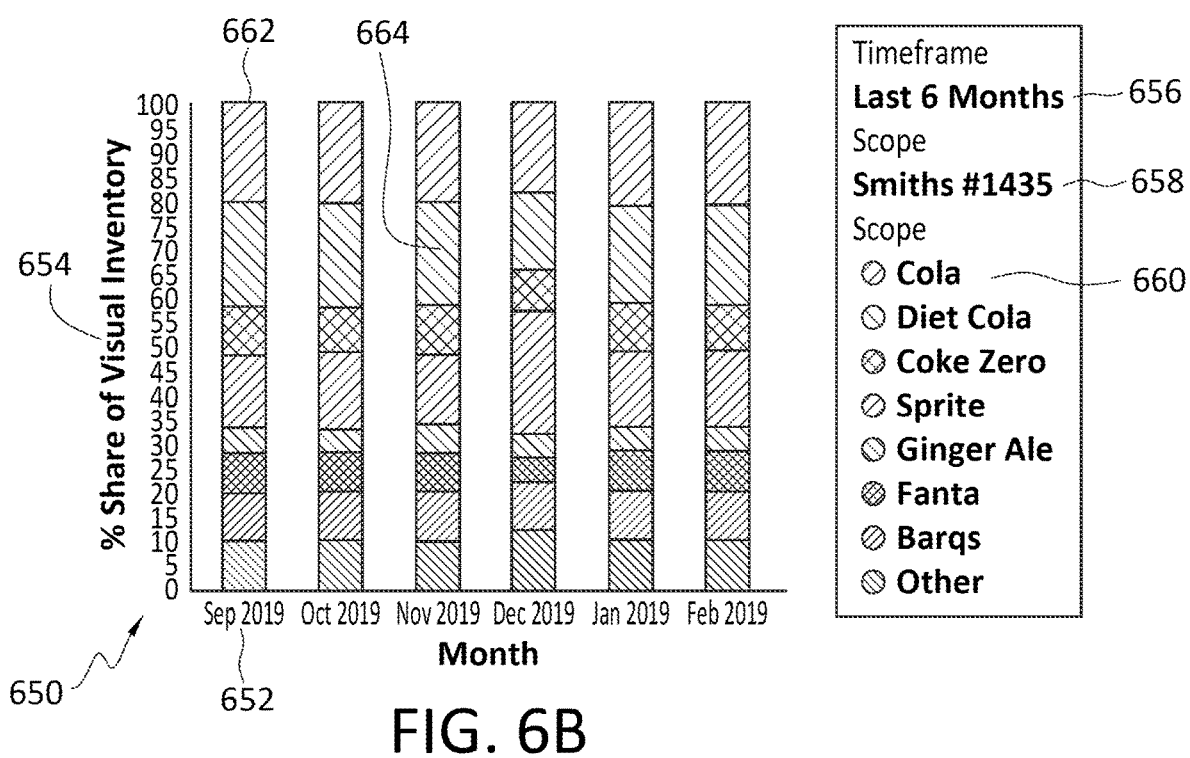
FIG. 6B is a graph of product sales data including percent share of visual inventory vs. time used in cooperation with the system of FIG. 6A.

Turning to FIGS. 6A and 6B, graphs of sales data 600 and inventory data 650 usable by the method and system of the present disclosure are shown. The sales data graph 600 includes a measurement of a percent share of sales 604 measured over time 602. The time period for each measurement may be any suitable measurement, such as a predetermined number of months. The graph 600 may be assessed for the predetermined time frame 606, e.g. six months, for a specific location 608, e.g. a specific retailer, and for a predetermined selection of products, for example a selection of soft drinks 610. The graph of sales data 600 may be shown in columns 612 corresponding to each month 606, with each column 612 comprising a segment 614 corresponding to one or more of the specific products 610. The graph 600 shows the trends of a selection of products over time for a particular location, which trends may be used in conjunction with three-dimensional object counting information obtained by the embodiments of a system and method according to the present disclosure.

Likewise, the inventory data graph 650 includes a measurement of a percent share of visual inventory 604 measured over time 602, and likewise defines a predetermined time frame 656, a particular location 658, and a predetermined selection of products such as soft drinks 660, with the data discretized into columns 662 by month, with segments 664 corresponding to individual products. In embodiments, the sales and inventory graphs 600, 650 correspond to a same time frame, location, and selection of products, yielding additional insights regarding an improved selection, quantity, and arrangement of objects. In embodiments, the inventory data graph 650 is automatically generated from the output from the third neural network described regarding the embodiment of FIG. 1, as the percent share of visual inventory is determined based on the object counting system and method embodiments.

Figure 7:
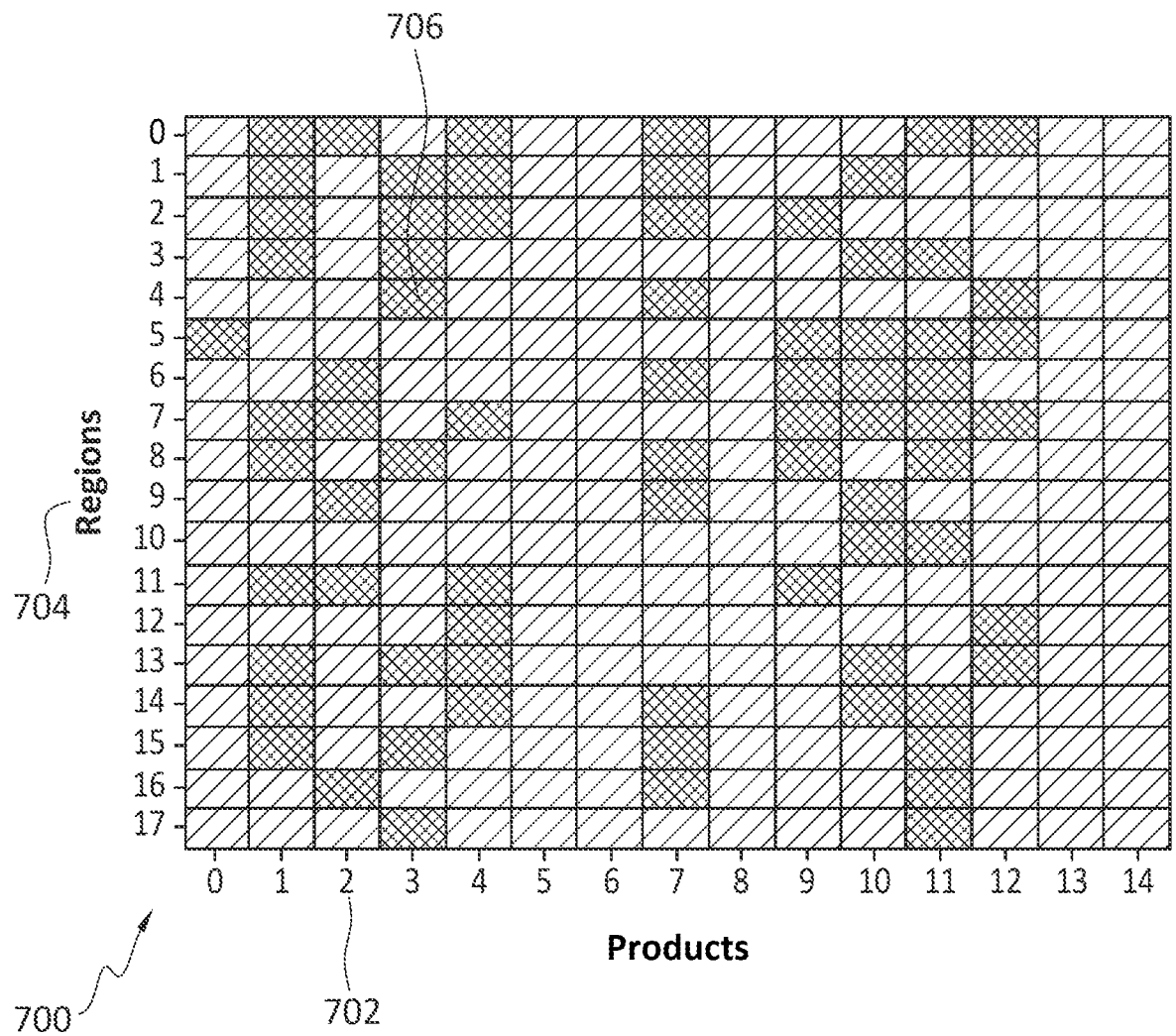
FIG. 7 is a graph of an index of products juxtaposed with an index of regions of a location generated using a system and method for three-dimensional object counting according to the embodiment of FIG. 1.

Turning now to FIG. 7, a third phase of the system and method for three-dimensional object counting includes prescriptive merchandising analytics that serve to increase sales. The third phase may consider, in addition to captured 2D images and 3D point clouds as described above, historical sales, the impact of location and adjacencies, seasonality, and segmentation, to generate store and display-level actions. In the graph 700, which may be a heatmap, an index of a predetermined selection of products 702 is juxtaposed against an index of a predetermined selection of regions 704 to define a grid, within the individual cells of which an indicium 706, such as a color, may be populated to indicate a desired property. For example, the indicium 706 may be provided when it is determined that a particular product, e.g. product number 3, should be considered for region 2.

Figure 8:
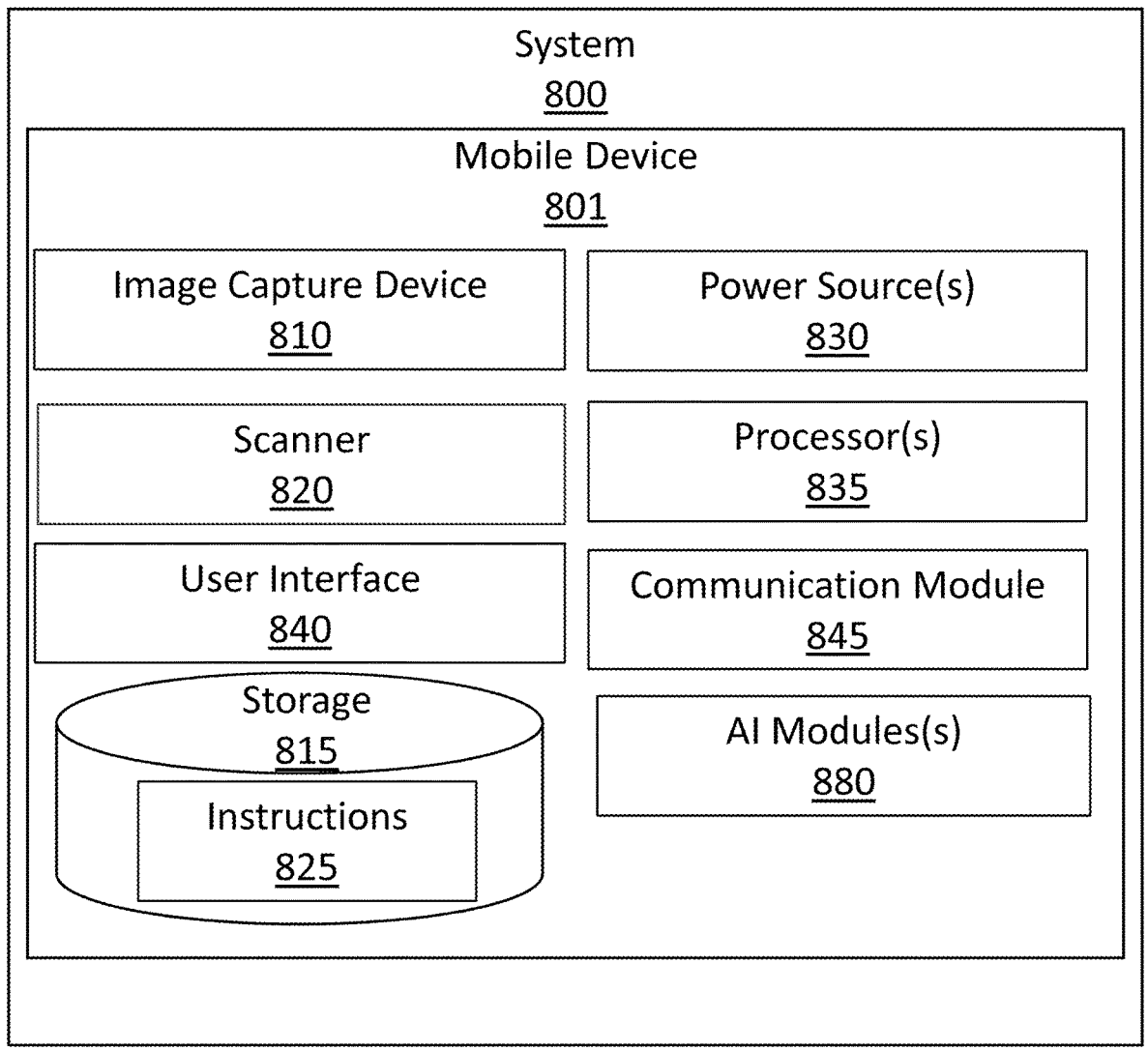
FIG. 8 is a diagram of a system for three-dimensional object counting according to the embodiment of FIG. 1.

FIG. 8 is a diagram of a system 800 for three-dimensional object counting. The system 800 comprises a mobile device 801, such as a tablet or smart phone, comprising an image capture device 810 configured for capturing a 2D image, such as an RGB image. The mobile device 801 may comprise a scanner 820 configured for capturing a 3D point cloud, such as a LiDAR scanner. The mobile device 801 may comprise a power source 830, a processor 835, a communication module 845, and a storage 815.

The storage 815 may comprise instructions 825 for operating a system for three-dimensional object counting stored thereon in a non-transitory form that, when executed by the processor 835, cause the processor 835 to carry out one or more of the steps described herein, in particular receiving 2D image data, 3D point cloud data, and detecting and identifying objects in a scene. The mobile device 801 may comprise one or more AI modules 880 configured to apply the first, second, and/or third neural networks described above regarding the embodiment of FIG. 1.

In embodiments, the mobile device 801 is configured to capture at least one 2D image, such as an RGB image, using the image capture device 810, capture a point cloud using the scanner 820, and process locally and in substantially real time the captured image(s) and point cloud data using the first, second, and third neural networks stored on the AI Module 880 to output three-dimensional object identity and counts as described above.

Figure 9:
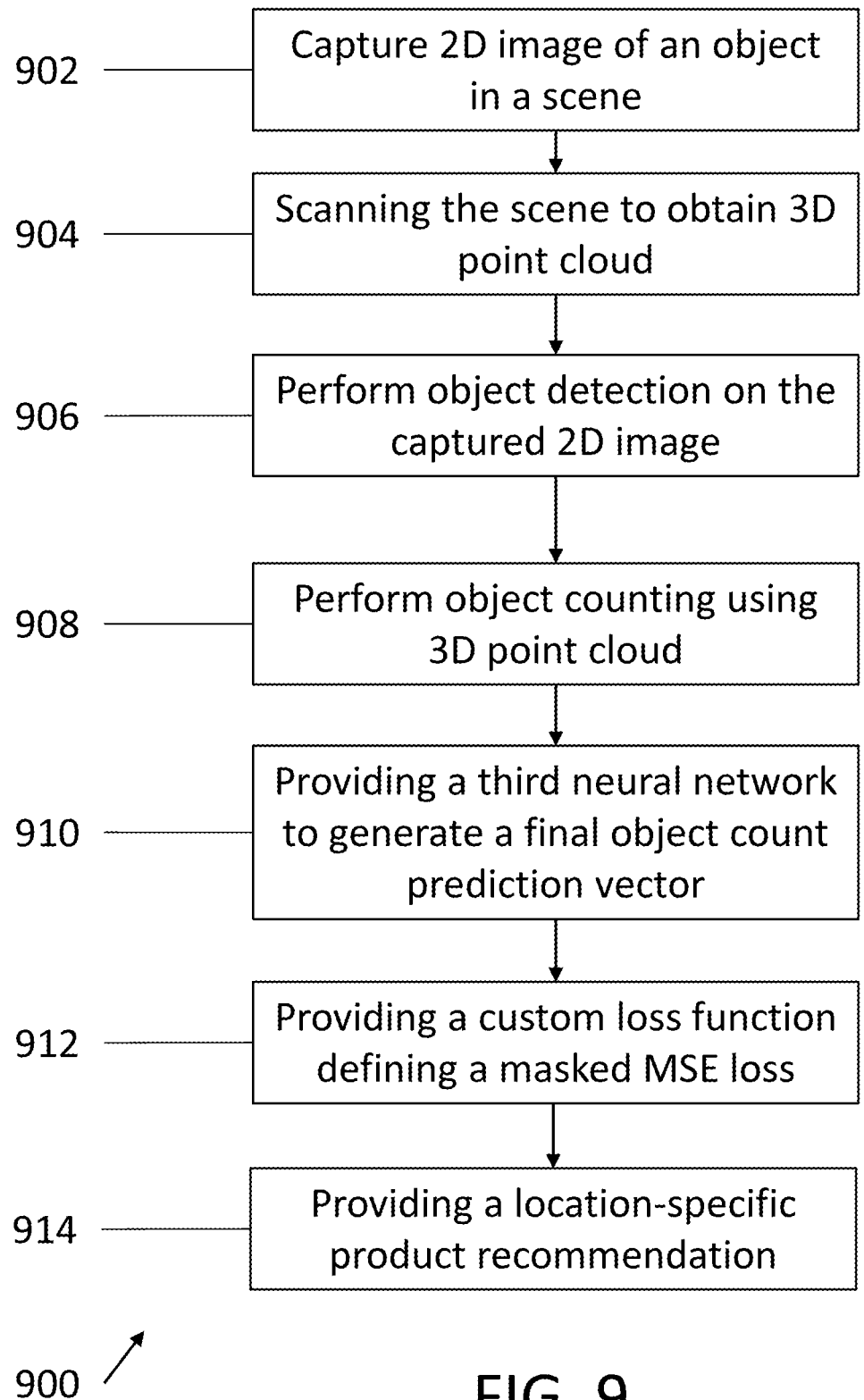
FIG. 9 is a diagram of a method for three-dimensional object counting according to the embodiment of FIG. 1.

A method 900 for three-dimensional object counting is shown in the diagram of FIG. 9, the steps of which may be performed in any suitable order. The method 900 includes a step 902 of capturing a 2D image of an object in a scene, such as a shelf of a warehouse or store, using an image capture device which may be integrated into a mobile device comprising a user interface and processor configured to perform steps of the method 900. The 2D image may be an RGB image.

Simultaneously, previously, or subsequently, a step 904 is performed of scanning the scene to obtain 3D point cloud data. The scanner may be a LiDAR scanner integrated with the mobile device such that the steps 902 and 904 may be performed using a same device.

A step 906 includes performing object detection upon the captured 2D image. As described above regarding the embodiment of FIG. 1, the 2D image is stored and fed to a first neural network, the output of which is a set of bounding boxes defining the area of each identified product in the scene and defining a centroid of at least one identified object using SLAM and the scanner. The centroids are projected into 3D space as a function of the position of the mobile device and relative locations of the identified objects.

A step 908 includes performing object counting using the 3D point cloud. The step 908, as described above regarding the embodiment of FIG. 1, includes constructing a 3D feature vector of the scene using the point cloud data which are fed to a second neural network.

A step 910 includes providing a third neural network configured to receive the 2D image information from the first neural network and the 3D point cloud information from the second neural network, and to concatenate latent point cloud representation with 2D data representation. This is then passed into a three-layer multi-layer perceptron, with an output of the third neural network being a final object count prediction vector.

A step 912 includes providing a custom loss function configured to infer counts. The loss function is essentially a masked MSE loss which leverages objects detected from visual information to adjust an error estimate at each training step, and ultimately to ensure that only non-zero components contribute to the loss.

A step 914 includes providing a location-specific product recommendation to a user based on the determined object counting and classification. The final object count prediction vector may be combined with one or more of sales data, segmentation, spatial data, seasonality, competitive data, display location, display adjacencies, or any other suitable metric.

A machine learning model may be used to combine the object count prediction vector with one or a combination of the above data to determine one or more of a product selection, quantity, and arrangement that may, for example, increase sales. The recommendation may be a store-level recommendation or a display-level recommendation. The recommendation may further comprise a determined location on a display or shelf for a product to be placed to drive sales.

Embodiments of the present disclosure may comprise or utilize a special-purpose or general-purpose computer system that includes computer hardware, such as, for example, one or more processors and system memory, as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the disclosure.

Transmission media can include a network and/or data links which can be used to carry program code in the form of computer-executable instructions or data structures, and which can be accessed by a general-purpose or special-purpose computer system. A "network" may be defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions may comprise, for example, instructions and data which, when executed by one or more processors, cause a general-purpose computer system, special-purpose computer system, or special-purpose processing device to perform a certain function or group of functions. Computer-executable instructions may be, for example, binaries, intermediate format instructions such as assembly language, or even source code.

The disclosure of the present application may be practiced in network computing environments with many types of computer system configurations, including, but not limited to, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

The disclosure of the present application may also be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

By providing a system and method for three-dimensional object counting according to disclosed embodiments, the problem of existing object identification and counting approaches being expensive, time consuming, and poorly adapted to the problem of determining an identity, selection, quantity, and/or configuration of objects within a space based on quantifiable metrics including one or a combination of sales data, spatial data, seasonality, competitive information, and others is addressed. The disclosed embodiments advantageously provide a system and method that identifies and provides actionable information regarding an improved arrangement of objects within a space while reducing the time to conduct and increasing the accuracy of an audit of a store or warehouse.

Not necessarily all such objects or advantages may be achieved under any embodiment of the disclosure. Those skilled in the art will recognize that the disclosure may be embodied or carried out to achieve or optimize one advantage or group of advantages as taught without achieving other objects or advantages as taught or suggested.

The skilled artisan will recognize the interchangeability of various components from different embodiments described. Besides the variations described, other known equivalents for each feature can be mixed and matched by one of ordinary skill in this art to construct or use a system or method for three-dimensional object counting under principles of the present disclosure. Therefore, the embodiments described may be adapted to object identification in stores and/or warehouses, in automotive applications, and any other suitable setting.

Although the system or method for three-dimensional object counting has been disclosed in certain preferred embodiments and examples, it therefore will be understood by those skilled in the art that the present disclosure extends beyond the disclosed embodiments to other alternative embodiments and/or uses of the system or method for three-dimensional object counting and obvious modifications and equivalents. It is intended that the scope of the present system or method for three-dimensional object counting disclosed should not be limited by the disclosed embodiments described above, but should be determined only by a fair reading of the claims that follow.

A first embodiment of a system and method for three-dimensional object counting includes an image capture device configured to obtain at least one 2D image of the three-dimensional space, a scanner configured to obtain a 3D point cloud of the three-dimensional space, and a processor configured to cooperate with at least one artificial neural network, the at least one artificial neural network configured to classify and count objects in the three-dimensional space.

A second embodiment of a system and method for three-dimensional object counting includes the components of the first embodiment and a second scanner configured for mapping a location, including display location and display adjacencies and/or restocking data at a display, including SKUs. The processor of the second embodiment is configured further to obtain display-level sales data and add spatial reporting.

A third embodiment of a system and method for three-dimensional object counting includes the components of the first embodiment and/or the second embodiment and comprises or cooperates with a machine learning model configured to receive one or more of historical sales data, the impact of display location and display adjacencies, seasonality, and segmentation, and to output one or more store-level and/or display-level recommendations, the recommendations configured to increase sales of a particular product or class of products.

What is claimed is:

1. A system for three-dimensional object counting in a three-dimensional space, the system comprising:
   an image capture device configured to obtain at least one 2D image of the three-dimensional space;
   a scanner configured to obtain a 3D point cloud of the three-dimensional space;
   a processor configured to cooperate with at least one artificial neural network, the at least one artificial neural network being configured to classify and count objects in the three-dimensional space using a monocular architecture of a combination of a 2D image recognition analysis based on the at least one 2D image obtained by the image capture device and a 3D point cloud analysis based on the 3D point cloud obtained by the scanner, wherein the at least one artificial neural network comprises a distinct first, second, and third artificial neural networks, wherein the first artificial neural network is configured to receive the at least one 2D image and to output a set of bounding boxes defining an area of each product of an identified product in the three-dimensional space and to define a centroid of at least one identified product, wherein the second artificial neural network is configured to receive the three-dimensional point cloud and to output a 3D feature vector of the three-dimensional space, and wherein the third artificial neural network is configured to receive the output of the first and second artificial neural networks and to output a predictions vector comprising a product identification and product count.

2. The system of claim 1, wherein the predictions vector is location-specific.

3. The system of claim 1, wherein the at least one artificial neural network includes a 2D object recognition model.

4. The system of claim 1, wherein the at least one artificial neural network includes a 3D feature extractor.

5. The system of claim 1, wherein the at least one artificial neural network includes a pre-trained PointNet model.

6. The system of claim 1, wherein the at least one artificial neural is configured to concatenate a centroid matrix and object embeddings.

7. The system of claim 1, wherein the system is configured to classify and count objects without manual application of bounding boxes to the 3D point cloud.

8. The system of claim 1, wherein the system is configured to label the at least one 2D image and to assign a confidence level to the label.

9. The system of claim 8, wherein the system is configured to allow a user to verify the label of the confidence level is below a predefined confidence threshold.

10. The system of claim 8, wherein the labeled 2D image is used to populate one or more datasets, the first artificial neural network is configured to cooperate with the one or more datasets.

11. The system of claim 1, wherein the image capture device configured to obtain the at least one 2D image of the three-dimensional space and the scanner configured to obtain the 3D point cloud of the three-dimensional space use the same scanning hardware devices.

12. The system of claim 1, wherein the image capture device configured to obtain the at least one 2D image of the three-dimensional space and the scanner configured to obtain the 3D point cloud of the three-dimensional space are different scanning hardware devices.

13. The system of claim 1, wherein the image capture device configured to obtain the at least one 2D image of the three-dimensional space and the scanner configured to obtain the 3D point cloud of the three-dimensional space are each integrated within a single mobile device.

14. The system of claim 1, wherein the scanner configured to obtain the 3D point cloud of the three-dimensional space includes a LiDAR scanner.

15. The system of claim 1, wherein the scanner configured to obtain the 3D point cloud of the three-dimensional space includes radar, sonar, IR sensors, stereoscopic depth cameras, time of flight cameras, ultrasonic sensors, photogrammetry, or any combination thereof or a combination of a digital camera and an infrared camera.

16. The system of claim 1, wherein the image capture device configured to obtain the at least one 2D image of the three-dimensional space is a RGB (red, green, blue) image capture device.

17. The system of claim 1, wherein the system is configured such that the image capture device obtains the at least one 2D image of the three-dimensional space and the scanner obtains the 3D point cloud of the three-dimensional space simultaneously.

18. A method for three-dimensional object counting, the method comprising the steps of:

capturing with an image capture device a 2D image of at least one object in a three-dimensional space;

scanning with a scanner the three-dimensional space to obtain a 3D point cloud;

using a processor to cooperate with at least one artificial neural network to classify and count objects in the three-dimensional space using a monocular architecture of a combination of a 2D image recognition analysis based on the at least one 2D image obtained by the image capture device and a 3D point cloud analysis based on the 3D point cloud obtained by the scanner, wherein the at least one artificial neural network comprises a distinct first, second, and third artificial neural networks, wherein the first artificial neural network receives the at least one 2D image and outputs a set of bounding boxes defining an area of each product of an identified product in the three-dimensional space and defines a centroid of at least one identified product, wherein the second artificial neural network receives the three-dimensional point cloud and outputs a 3D feature vector of the three-dimensional space, and wherein the third artificial neural network receives the output of the first and second artificial neural networks and outputs a predictions vector comprising a product identification and product count.

19. The method of claim 18, wherein the object counting is performed without manually applying bounding boxes to the at least one object.

20. A non-transitory hardware storage device having stored thereon computer executable instructions which, when executed by one or more processors of a computer, configure the computer to perform at least the following:

capture with an image capture device a 2D image of at least one object in a three-dimensional space;

scan with a scanner the three-dimensional space to obtain a 3D point cloud;

use a processor to cooperate with at least one artificial neural network to classify and count objects in the three-dimensional space using a monocular architecture of a combination of a 2D image recognition analysis based on the at least one 2D image obtained by the image capture device and a 3D point cloud analysis based on the 3D point cloud obtained by the scanner, wherein the at least one artificial neural network comprises a distinct first, second, and third artificial neural networks, wherein the first artificial neural network receives the at least one 2D image and outputs a set of bounding boxes defining an area of each product of an identified product in the three-dimensional space and defines a centroid of at least one identified product, wherein the second artificial neural network receives the three-dimensional point cloud and outputs a 3D feature vector of the three-dimensional space, and wherein the third artificial neural network receives the output of the first and second artificial neural networks and outputs a predictions vector comprising a product identification and product count.

* * * * *